(12) United States Patent
Yano et al.

(10) Patent No.: US 7,522,561 B2
(45) Date of Patent: Apr. 21, 2009

(54) OUTER-LOOP POWER CONTROL DEVICE AND METHOD THEREOF

(75) Inventors: Tetsuya Yano, Kawasaki (JP); Kazuhisa Obuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 840 days.

(21) Appl. No.: 10/616,067

(22) Filed: Jul. 9, 2003

(65) Prior Publication Data

US 2004/0008639 A1 Jan. 15, 2004

Related U.S. Application Data

(63) Continuation of application No. PCT/JP01/00267, filed on Jan. 17, 2001.

(51) Int. Cl.
*H04B 7/00* (2006.01)
*H04W 4/00* (2009.01)

(52) U.S. Cl. .................... 370/333; 455/522

(58) Field of Classification Search ............... 370/318, 370/342, 320, 322, 335, 431, 441, 332, 333; 455/522
See application file for complete search history.

(56) References Cited

U.S. PATENT DOCUMENTS

| | | | |
|---|---|---|---|
| 6,341,224 B1 * | 1/2002 | Dohi et al. ............ | 455/522 |
| 6,529,482 B1 * | 3/2003 | Lundby ................ | 370/252 |
| 6,633,553 B1 * | 10/2003 | Hwang ................ | 370/329 |
| 6,711,150 B1 * | 3/2004 | Vanghi ................ | 370/342 |
| 6,748,234 B1 * | 6/2004 | Agrawal et al. ....... | 455/522 |
| 6,781,973 B1 * | 8/2004 | Lee .................... | 370/332 |
| 6,791,954 B1 * | 9/2004 | Cheng et al. ........ | 370/311 |
| 6,807,164 B1 * | 10/2004 | Almgren et al. ...... | 370/342 |
| 6,816,717 B1 * | 11/2004 | Sipila ................ | 455/277.2 |
| 6,963,553 B1 * | 11/2005 | Cordier et al. ....... | 370/342 |
| 7,020,483 B2 * | 3/2006 | Oestreich ............ | 455/522 |
| 2002/0094836 A1 * | 7/2002 | Nakamura et al. ..... | 455/522 |

FOREIGN PATENT DOCUMENTS

JP 2000-196566 7/2000

OTHER PUBLICATIONS

H.Kawai, H. Suda and F. Adachi, "Outer-Loop Control of Target Sir for Fast Transmit Power Control in Turbo-Coded W-CDMA Mobile Radio", IEEE 1999 Electronics Letters, Apr. 29, 1999 vol. 35 No. 9.*

(Continued)

*Primary Examiner*—Wing F Chan
*Assistant Examiner*—Hicham B Foud
(74) *Attorney, Agent, or Firm*—Katten Muchin Rosenman LLP

(57) ABSTRACT

The reference SIR control command determination unit of a reference SIR control unit provides a DSP with a target BLER and obtains an observation time period Sinc and Sdec from a conversion table in which an observation time period T, a reference SIR increase step Sinc, and a reference SIR decrease step Sdec are set in advance in such a way to satisfy a theoretical equation, including the BLER. A register stores these pieces of data. A reference SIR increase/decrease control unit compares a result obtained by increasing/decreasing a reference SIR using Sinc or Sdec with an SIR measurement value, based on a data error state detected by a CRC detection unit and generates a transmission power control command.

13 Claims, 27 Drawing Sheets

OTHER PUBLICATIONS

Higuchi, et al., "Experiments of Fast Transmit Power Control Using Outer Loop With Variable Step Size in W-CDMA" B-5-41: The 2000 Spring Conference, p. 426; Mar. 2000.

Taoka, et al., "Performance of Fast Transmit Power Control Using Outer Loop for Coherent Adaptive Antenna Array Diversity Receiver in W-CDMA Reverse Link" Technical Report of IEICE; Sep. 2000, pp. 33-38.

Sekine, et al., "An Outer Loop Communication Quality Control for CDMA Systems" B-5-72: The 2000 Spring Conference; Mar. 2000, p. 457.

Hamabe, "Outer Loop Algorithm of Transmission POWR Control in CDMA Cellular Systems" B-5-145: The 1999 IEICE Spring Conference: Mar. 1999; p. 496.

Japanese Patent Office Notice of Rejection dated Mar. 28, 2006 with translation.

* cited by examiner

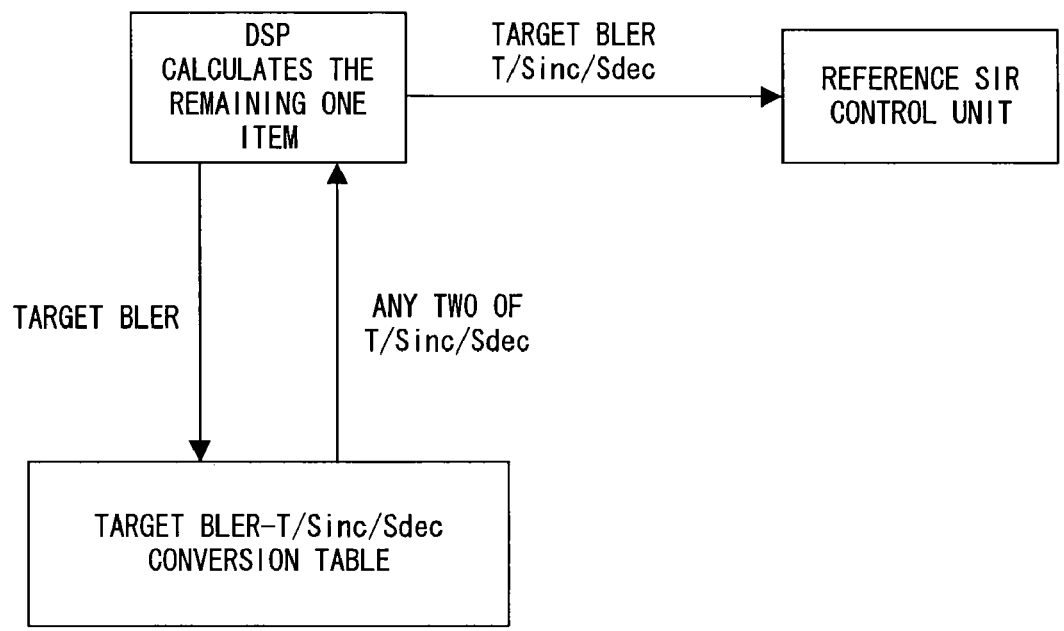
F I G. 3

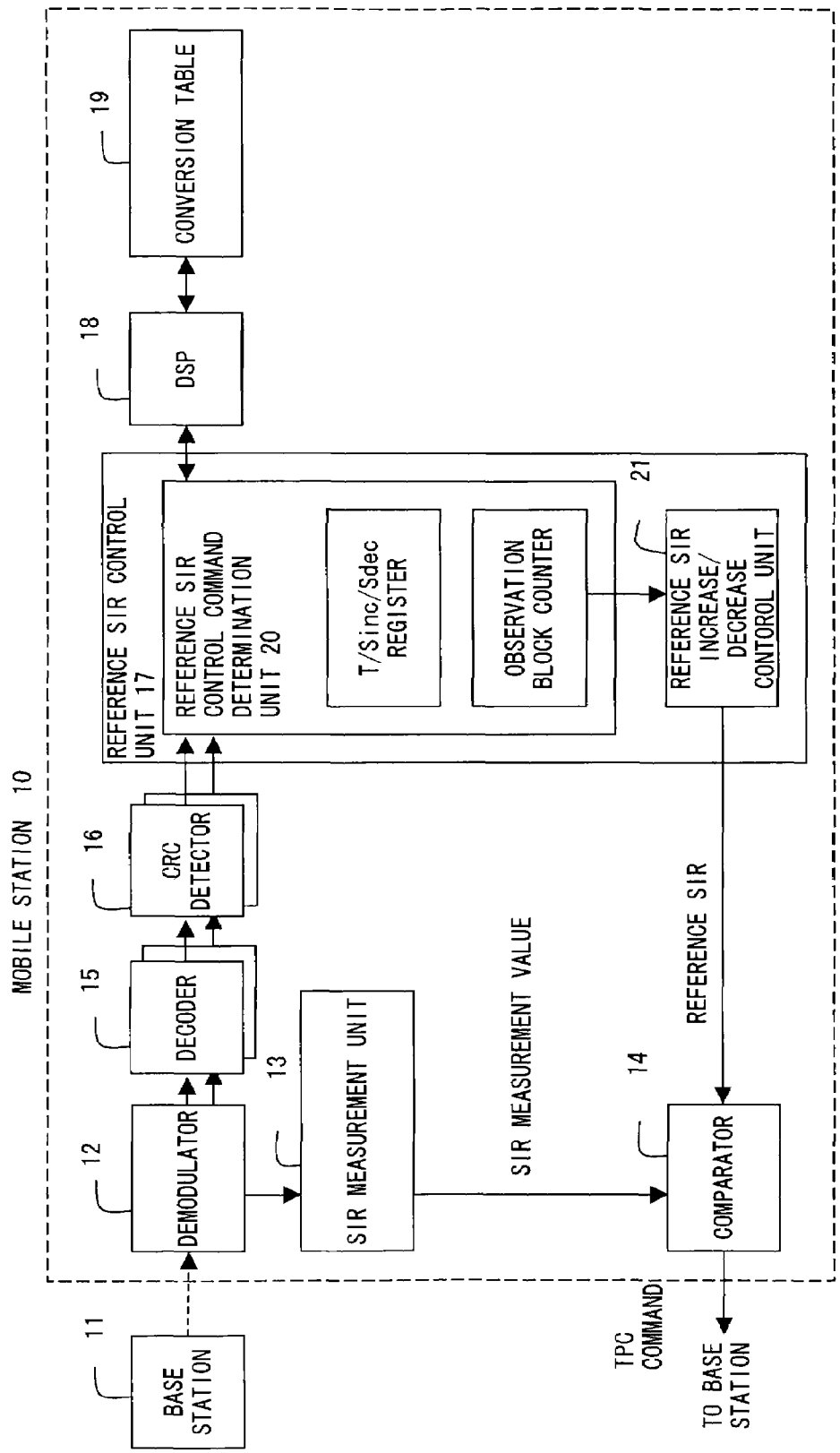
F I G. 8

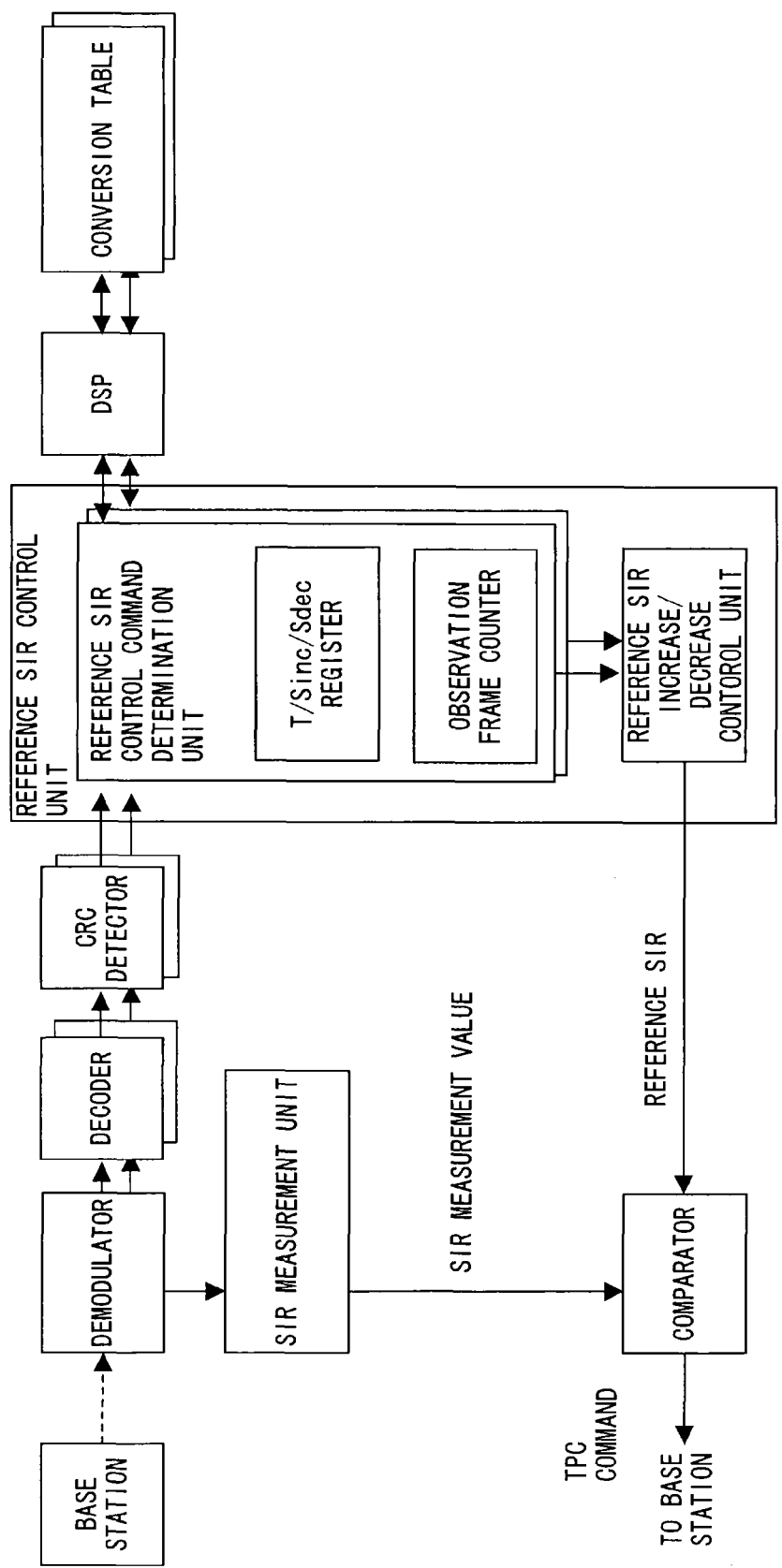
F I G. 12

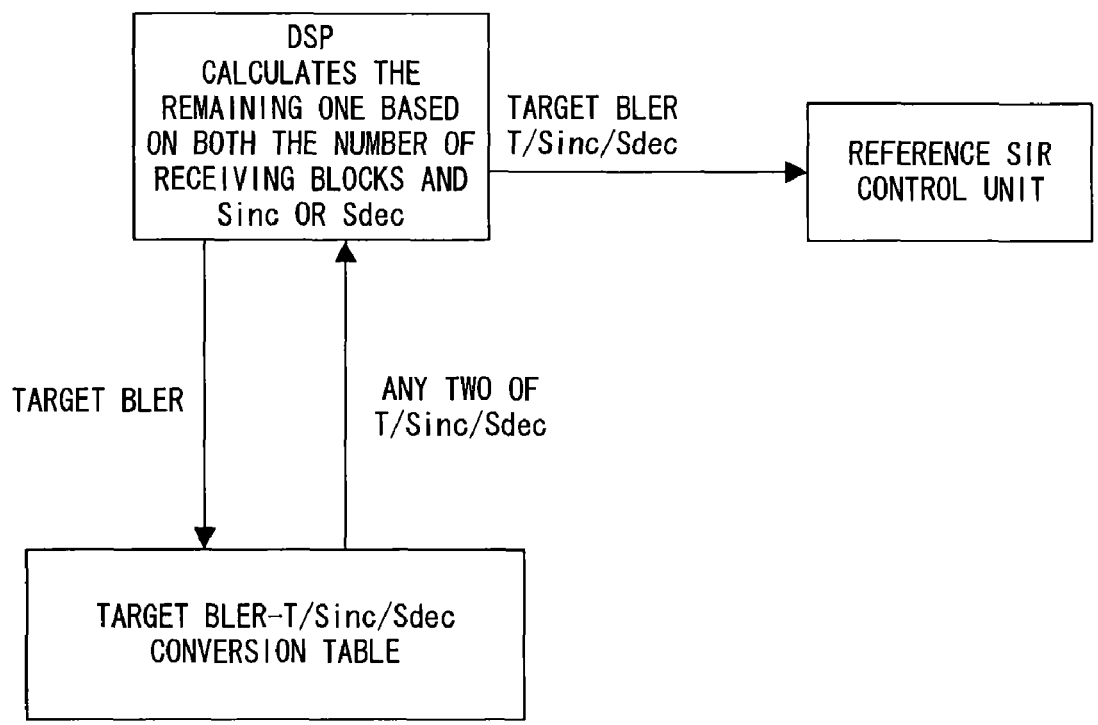
F I G. 1 4

OUTER-LOOP POWER CONTROL DEVICE AND METHOD THEREOF

CROSS REFERENCE TO RELATED APPLICATION

This application is a continuation of international PCT application No. PCT/JP01/00267 filed on Jan. 17, 2001.

BACKGROUND OF THE INVENTION

1. Field of the Invention

The present invention relates to an outer-loop control device in a CDMA mobile communications system and a method thereof.

2. Description of the Related Art

Recently, a CDMA mobile communications system has been spotlighted as a next-generation communications system.

In a CDMA mobile communications system, a plurality of channels share one frequency band. In this case, each channel is identified by a spreading code attached to it. Therefore, an interference noise power varies depending on the number of simultaneous user.

Generally, the longer a propagation distance is, the larger the power attenuation of a radio wave is. The instantaneous power value of a receiving signal also changes due to multi-path fading and the like. Therefore, it is difficult to stably maintain the communications quality of a mobile station connected to a base station at a desired level.

In order to follow such a large change in the number of interfering users and instantaneous value changes due to multi-path fading, a closed loop transmission power control (TPC), for controlling an SIR in such a way that an SIR (signal to interference ratio) on a receiving side may approach a reference SIR, is exercised by measuring a signal-to-interference power ratio (SIR) on the receiving side and comparing the measurement value with the reference SIR.

However, an SIR needed to obtain a desired quality (block error rate) varies with the change of travel speed in communications or the change of a propagation environment during travel. A block error is observed in order to compensate for this change. If the observed value is higher than a desired BLER (target block error rate), the reference SIR is increased. If the observation value is lower than a desired BLER, the reference SIR is decreased. Flexibly controlling a reference SIR in this way is called outer-loop control.

For the outer-loop control method described above, the following methods have been used.
(1) Technical Report of IEICE, RCS98-18, pp. 51-57
(2) The 1999 General Conference of The Institute of Electronics, Information and Communication Engineers, B-5-145
(3) The 2000 General Conference of The Institute of Electronics, Information and Communication Engineers, B-5-72, etc.

In the description below, the following symbols are used.
T: Block error observation time period
BLER: Target block error rate
Sinc: Unit increment in the case where a reference SIR is increased at the time of a reference SIR update
Sdec: Unit decrement in the case where a reference SIR is decreased at the time of a reference SIR update In method (1), a reference SIR is increased/decreased depending on the number of block errors occurring in a predetermined observation time period.

In method (2), it is detected whether there is an error in each block. If there is an error, the reference SIR is increased. If there is no error, the reference SIR is decreased.

In method (3), if there is an error in an observation time period T calculated by T (block error observation time period) =round (ln 2/BLER), the reference SIR is increased. If there is no error, the reference SIR is decreased. The word "round" means to count fractions of 5 and over as a unit and to disregard the rest.

Table 1 shows the comparison result of these methods.

TABLE 1

| | Features of Prior Arts | | |
|---|---|---|---|
| | [1] | [2] | [3] |
| observation time period of block error rate | constant | 1 | constant T = round (ln 2/BLER) |
| Reference SIR update timing | When an observation time period comes to an end | For each block | time of error occurrence when observation time period ends |
| Update step | Varies depending on the number of errors occurring in an observation time period. | Increment ≠ decrement BLER × Sinc = (1 − BLER) × Sdec | increment = decrement |

In method (1), a reference SIR update interval is fixed and is long. Both the update interval and the increment/decrement of the reference SIR are empirically determined. No theoretical ground is shown.

In method (2), the size of Sdec is sometimes too small compared with Sinc. For example, if a target block error rate, the increment Sinc of a reference SIR are 0.01 and 1 (dB), respectively, the decrement Sdec of the reference SIR becomes approximately 0.01 (dB) and is too small. If the value must be implemented by hardware and if both SIR measurement accuracy and a reference SIR control step are taken into consideration, it is not practical to finely control the reference SIR in this way.

In method (3), if a BLER is given, an observation time period T is uniquely determined. If there is an error, the reference SIR can be immediately updated. However, if there is no error, the set observation time period cannot be updated. Therefore, if a BLER is low, au update interval becomes fairly long.

SUMMARY OF THE INVENTION

An object of the present invention is to provide a higher-speed and higher-accuracy outer-loop control device for reducing the amount of interference given to another terminal and a method thereof.

In the outer-loop control device of the present invention, the reference signal-to-interference power ratio, which is the basis of transmission power control by a communications environment, is variable. The control device comprises a signal-to-interference power ratio measurement unit measuring the signal-to-interference power ratio of a receiving signal, an error rate measurement unit measuring the error rate of receiving data, a reference signal-to-interference power ratio modification unit setting the observation time period/number of error rate observation target data blocks of an error rate, the unit increment of a reference signal-to-interference power ratio, the unit decrement of a reference signal-to-interference power ratio and a target signal error rate in such a way to satisfy a prescribed relation equation and modifying the reference signal-to-interference power ratio, based on the measured error rate, and a command generation unit generating a command signal for transmission power control by comparing the modified reference signal-to-interference power ratio with the measured signal-to-interference power ratio.

In the outer-loop power control method of the present invention, the reference signal-to-interference power ratio, which is the basis of transmission power control by a communications environment, is variable. The control method comprises measuring the signal-to-interference power ratio of a receiving signal (signal-to-interference power ratio measurement step), measuring the error rate of receiving data (error rate measurement step), setting the observation time period/number of error rate observation target data blocks of an error rate, the unit increment of a reference signal-to-interference power ratio, the unit decrement of a reference signal-to-interference power ratio and a target signal error rate in such a way to satisfy a prescribed relation equation and modifying the reference signal-to-interference power ratio, based on the measured error rate (reference signal-to-interference power ratio modification step) and generating a command signal for transmission power control by comparing the modified reference signal-to-interference power ratio with the measured signal-to-interference power ratio (command generation step).

According to the present invention, since the unit modification amount of a reference signal-to-interference power ratio can be flexibly set according to a prescribed relation equation, finer transmission power control can be exercised. Since a data error rate can be properly prevented from degrading, quality communications can be maintained.

Since in an initial state where a terminal or base station has just been activated, the modification of a reference signal-to-interference power ratio can be rapidly converged to a stable state by properly setting the unit modification amount, the negative influence of the interference power of a radio wave transmitted by the relevant terminal, which is passed to another terminal due to prolonged improper transmission power control, can be suppressed.

BRIEF DESCRIPTION OF DRAWINGS

FIG. 3 shows the configuration of the T/Sinc/Sdec determination unit (No. 2).

FIG. 8 shows the configuration of the device in the second preferred embodiment.

FIG. 12 shows the configuration of the device in the fifth preferred embodiment.

FIG. 14 shows the sixth preferred embodiment of the present invention (No.2).

DESCRIPTION OF THE PREFERRED EMBODIMENTS

Both a target BLER in a stable state and the conditions of observation time period/Sinc/Sdec of a block error are theoretically calculated, and the observation time period, Sinc and Sdec are set in such a way to meet the conditions.

According to this method, it is acceptable if the observation time period/Sinc/Sdec of a block error are determined in such a way to meet specific conditions. Therefore, each parameter can be freely set. Even if there is a restriction in hardware design, design can be adjusted accordingly.

In the first preferred embodiment, control is exercised as follows. Specifically, since a no-error probability in the case where one block is observed in a state where communications are conducted at a block error rate of BLER is (1-BLER), a no-error probability through all T blocks is as follows, assuming that an observation time period is T blocks.

$$(1-\text{BLER})^T$$

An error probability within the observation time period is obtained as follows by subtracting the expression from 1.

$$1-(1-\text{BLER})^T$$

In the outer-loop control of the present invention, if there is an error, the reference SIR is increased by Sinc. If there is no error after T blocks are observed, the reference SIR is decreased by Sdec. In this example, in the case of a probability of $1-(1-BLER)^T$, the reference SIR is increased by Sinc. In the case of a probability of $(1-BLER)^T$, the reference SIR is decreased by Sdec.

Since the increment and decrement of an average reference SIR are equal in a stable state where a block error rate is averagely maintained at a target level, the following equation holds true.

$$\{1-(1-BLER)^T\} \times Sinc = (1-BLER)^T \times Sdec \quad (1)$$

If T, Sinc, and Sdec are set in such a way to satisfy equation (1), the block error rate can be converged to BLER.

Figure 1:
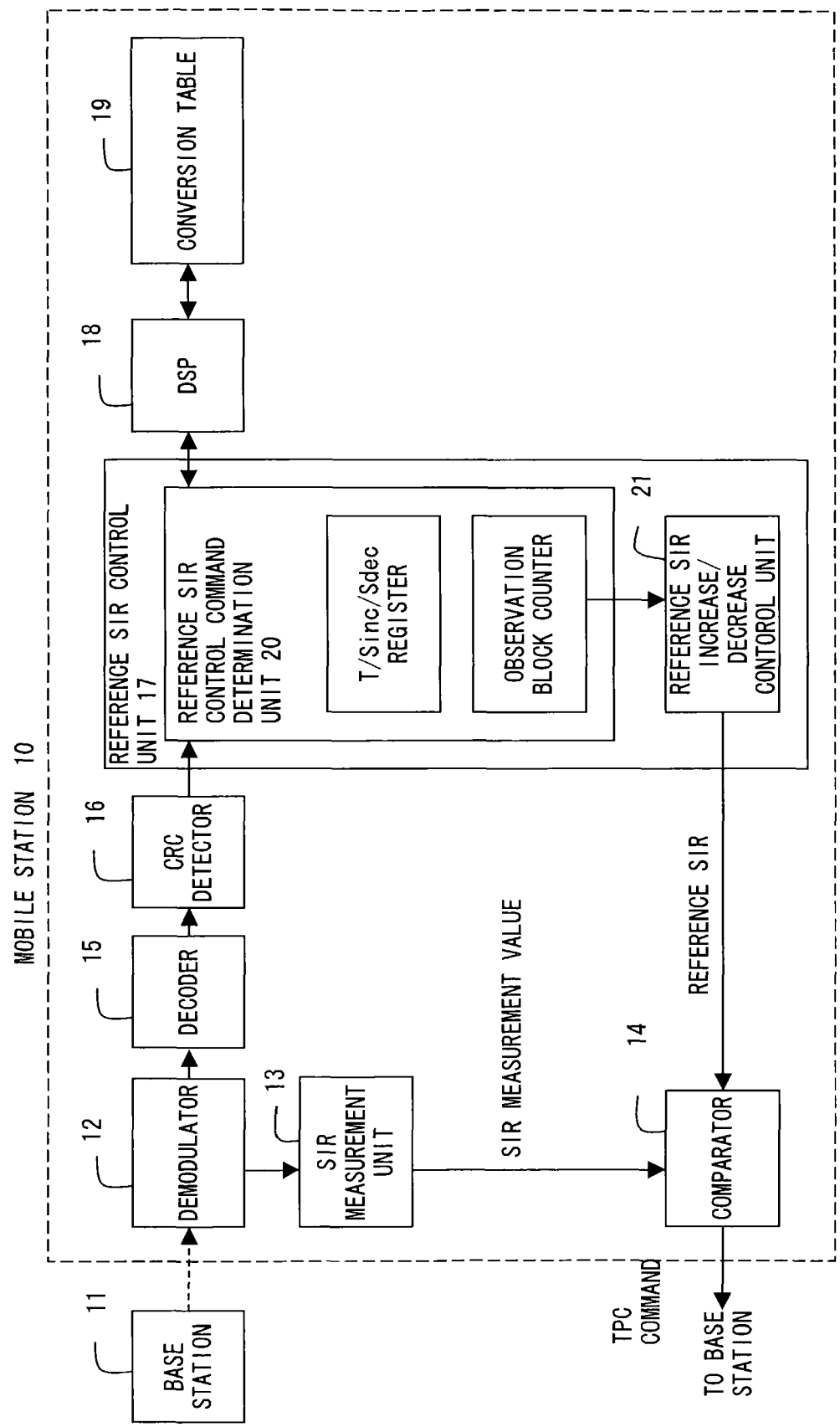
FIG. 1 shows the configuration of the transmission power control device in the first preferred embodiment of the present invention.

FIG. 1 shows the configuration of the transmission power control system in the first preferred embodiment of the present invention.

A mobile station 10 receives a signal from a base station 11 and demodulates the signal using a demodulator 12. An SIR measurement unit 13 measures the SIR of the receiving signal using the pilot section of the signal outputted from the demodulator 12. A comparator 14 compares the SIR measurement value with a reference SIR. If the SIR measurement value is larger than the reference SIR, the comparator 14 generates and outputs a command to request a base station to decrease the transmission power. If the SIR measurement value is smaller than the reference SIR, the comparator 14 generates and outputs a command to request a base station to increase the transmission power. A decoder 15 decodes the signal outputted from the demodulator 12. A CRC detector 16 detects a CRC from the decoding result. A reference SIR control unit 17 increases/decreases the reference SIR, which is the basis of outer-loop power control, according to the algorithm shown in FIG. 4. T, Sinc, and Sdec are set in the reference SIR control unit 17 in such a way to satisfy equation (1).

In this case, generally, the smaller T is, the better BLER change can be followed up. Therefore, it is preferable for T to be as small as possible. Qualitatively, the smaller T is, the larger and smaller Sinc and Sdec, respectively, become. If either Sinc or Sdec becomes too large, a target SIR (reference SIR) greatly changes. This phenomenon is not preferable from the viewpoint of a characteristic, interference and the like.

The ranges of optimal T, Sinc and Sdec are determined by taking into consideration both characteristics and hardware feasibility. Therefore, it is acceptable if of three parameters, two are first selected within the respective ranges and the remaining one is determined in such a way to satisfy equation (1).

Prior to the hardware implementation, the optimal value of each of T, Sinc, and Sdec is calculated in advance by actually computing the average value of the BLER and reference SIR of each of a variety of the combination of T, Sinc, and Sdec. Of the calculated parameter values of T, Sinc and Sdec, three or two values are stored in a table format in advance.

The allowable range of each of T, Sinc, and Sdec corresponding to a target BLER is stored in a table format in advance. Of the three parameters, two parameters are selected and the remaining parameter is calculated using a DSP. If the calculation result is located within the allowable range, the value is adopted. If the calculation result is located out of the allowable range, the parameter value is calculated with another combination of T, Sinc and Sdec, and the calculation is repeated until the calculation result is located within the allowable range. The calculation result obtained in this way is transmitted to the reference SIR control unit.

Specifically, the parameter values satisfying equation (1) of T, Sinc, and Sdec corresponding to a target BLER are calculated in advance, are stored in a table format and are written in a ROM. If a higher-order layer designates a target BLER, the DSP accesses the ROM storing both the target BLER and the combination of T, Sinc, and Sdec. The DSP reads T, Sinc, and Sdec to be set and transmits the read parameters to the reference SIR control unit.

If each target BLER is given, parameters suitable for the target BLER can be calculated. Therefore, all the parameters are calculated and are stored in a table format in advance.

Alternatively, the table can include only two of the three parameters of T, Sinc, and Sdec in advance, and after the two parameters are read, the DSP can also calculate the remaining one parameter.

Therefore, the reference SIR control command determination unit 20 of the reference SIR control unit 17 comprises a register temporarily storing T, Sinc, and Sdec, and a counter counting the number of observation blocks. The reference SIR control command determination unit 20 also communicates with a DSP 18 and obtains optimal T, Sinc, and Sdec. The DSP 18 refers to a conversion table 19 storing the optimal combination of T, Sinc and Sdec, extracts a combination of T, Sinc and Sdec suitable for the BLER value and stores the combination in the register of the reference SIR control command determination unit 20. The observation block counter counts the number of received blocks and CRC detector 16 judges whether there is an error throughout T blocks. If there is an error throughout T blocks, the reference SIR is increased and transmitted to a comparator 14. If there is no error throughout T blocks, Sdec is inputted to the reference SIR increase/decrease control unit 21 from the register, the reference SIR is decreased and is transmitted to the comparator 14. The comparator 14 compares the SIR measurement value with the reference SIR, generates a TPC command and transmits control information to the base station 11.

Although in this example, a mobile terminal has the configuration shown in FIG. 1, a base station can also have such a configuration.

Figure 2:
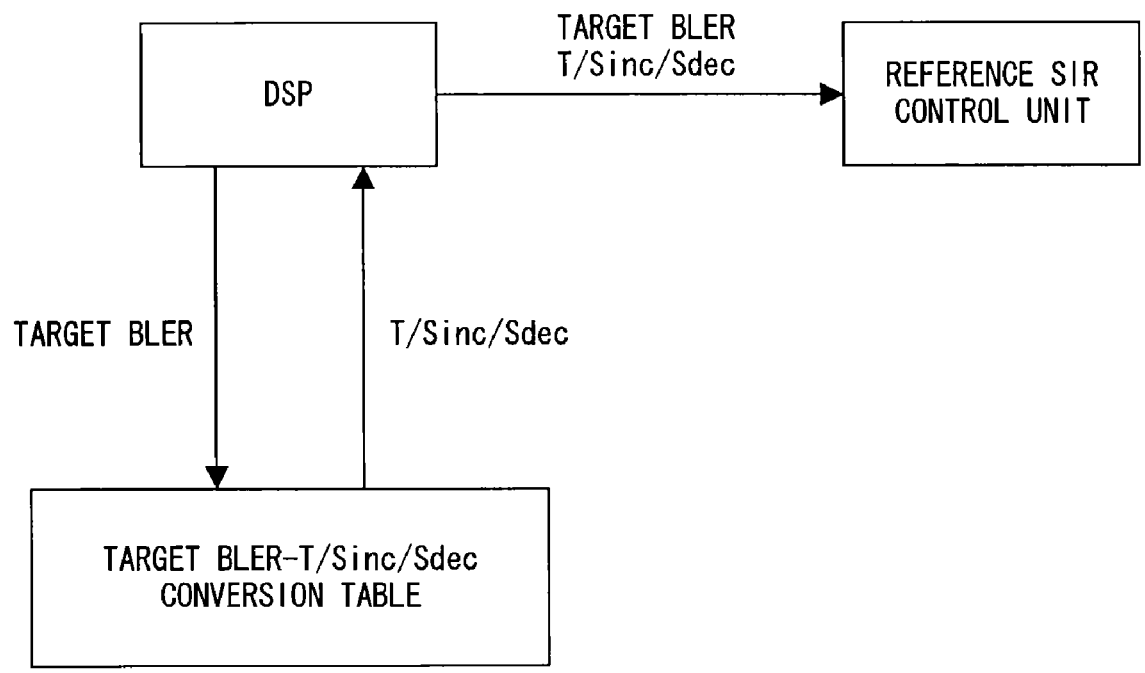
FIG. 2 shows the configuration of the T/Sinc/Sdec determination unit (No. 1).

FIGS. 2 and 3 show the configurations of a T/Sinc/Sdec determination unit.

In FIG. 2, when obtaining optimal T, Sinc, and Sdec, the DSP transfers a target BLER to the conversion table as an index. The conversion table searches for T, Sinc, and Sdec using this target BLER as a key, and transfers T, Sinc, and Sdec, to the DSP. Then, the DSP notifies the reference SIR control unit of T, Sinc and Sdec, obtained in this way together with a target BLER.

Alternatively, as shown in FIG. 3, the DSP can obtain all of T, Sinc and Sdec by obtaining two of T, Sinc, and Sdec from the conversion table using a target BLER and calculating the remaining one using equation (1) or in the case of a preferred embodiment described later, the equation, and can transfer all of T. Sinc, and Sdec to the reference SIR control unit together with the target BLER.

Figure 4:
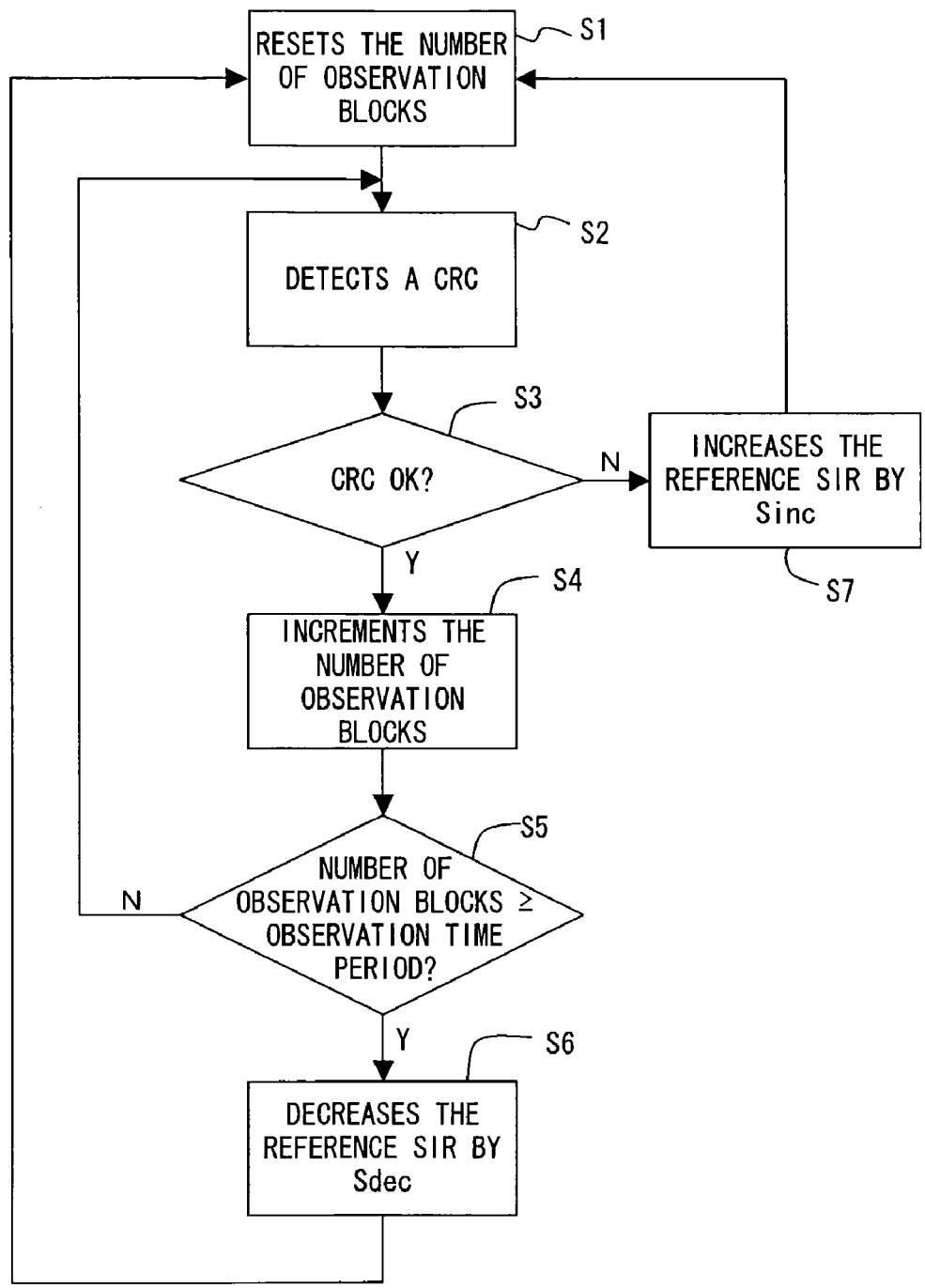
FIG. 4 is a flowchart showing the process of the first preferred embodiment.

FIG. 4 is a flowchart showing the process of the first preferred embodiment.

First, in step S1, the number of observation blocks is reset. Then, in step S2, a CRC is detected. If in step S3, it is judged that there is an error, in step S7 the reference SIR is increased by Sinc, and the process returns to step S1. If in step S3 it is judged that there is no error, in step S4 the number of observation blocks is incremented, and the process proceeds to step S5. Then, in step S5, it is judged whether the number of observation blocks exceeds that of the observation time period. If the judgment in step S5 is no, the process returns to step S2. If the judgment in step S5 is yes, in step S6 the reference SIR is decreased by Sdec, and the process returns to step S1.

Figure 5:
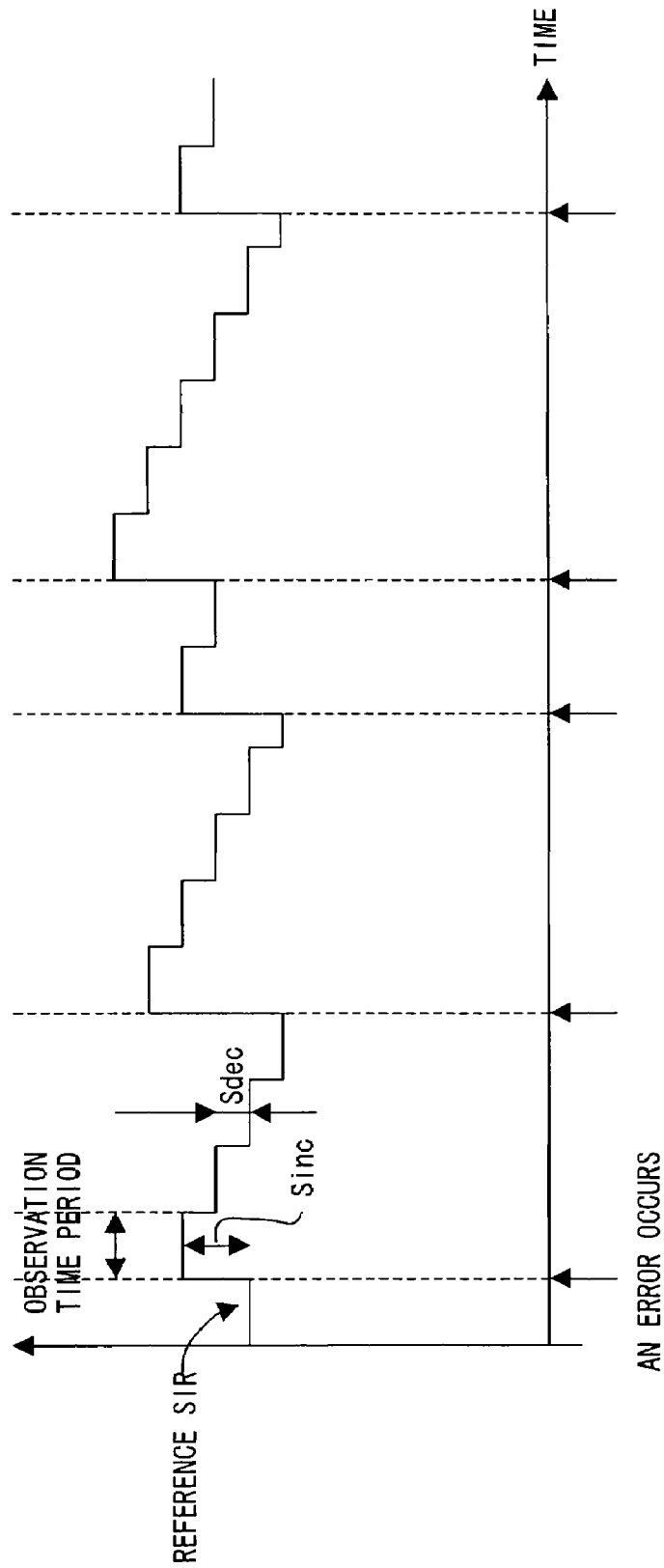
FIG. 5 shows an example of reference SIR increase/decrease by outer-loop control.

FIG. 5 shows an example of the increase/decrease of the reference SIR by outer-loop control.

As shown in FIG. 5, if an error is caused in the reference SIR by the outer-loop control described above, the reference SIR is increased by Sinc. If there is no error during the observation time period, the reference SIR is decreased by Sdec. In this way, the reference SIR continues to maintain an optimal value while repeating ups and downs.

Figure 6:
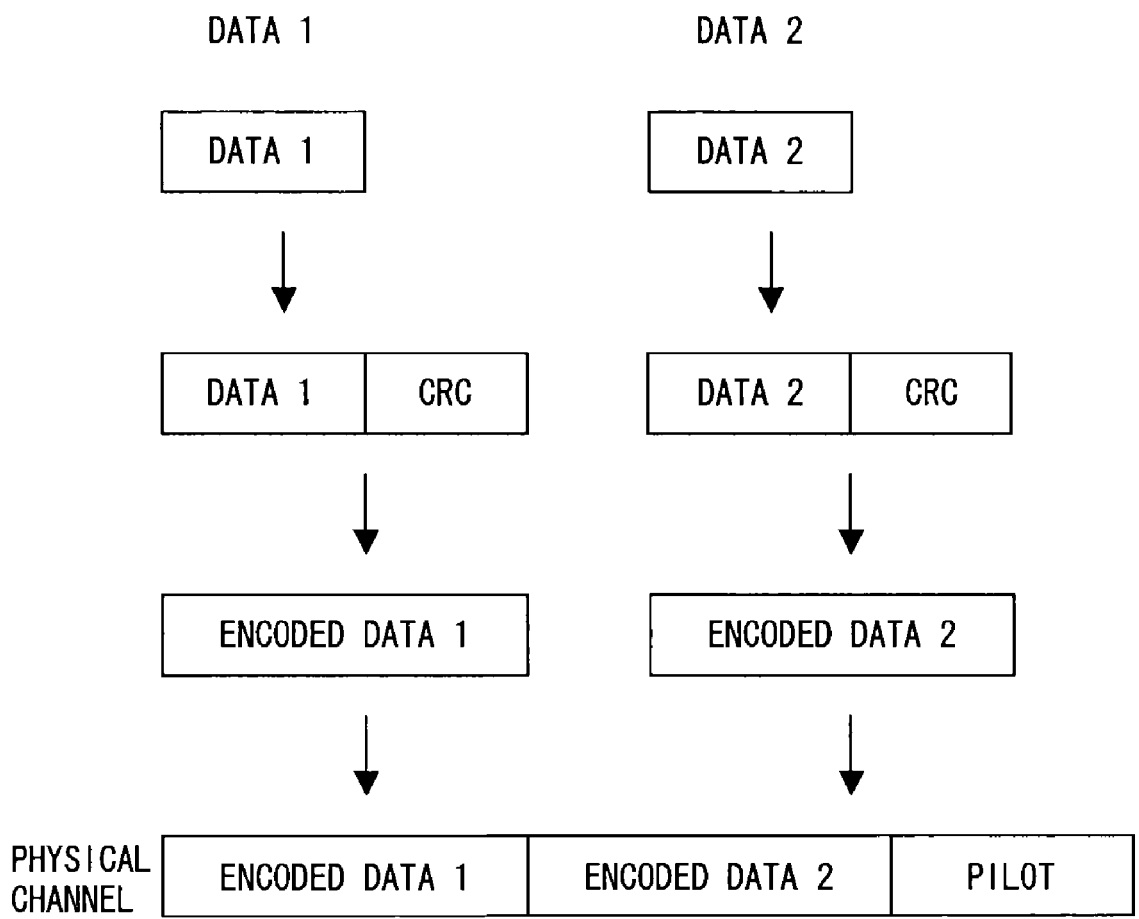
FIG. 6 shows the data process in the second preferred embodiment of the present invention.

FIG. 6 shows the configuration of the second preferred embodiment of the present invention.

If as shown in FIG. 6, a plurality of pieces of data are multiplexed in one physical channel and if there is no error in any piece of data during observation time period T, the reference SIR is decreases by Sdec. If there is an error in one piece of data during the observation time period, the reference SIR is increased by Sinc when the error occurs.

For convenience' sake, a case where two pieces of data are multiplexed is described.

It is assumed that the target block error rates of the first and second data are BLER1 and BLER2, respectively.

Since a probability that there may be no error in all pieces of data is (1-BLER1)×(1-BLER2) per block, a probability that there may be no error in all pieces of data if T observation blocks are observed assuming that an observation time period is T is as follows.

$$\{(1\text{-BLER1})\times(1\text{-BLER2})\}^T$$

However, a probability that there may be an error in one piece of data is obtained as follows by subtracting the equation from 1.

$$1-\{(1\text{-BLER1})\times(1\text{-BLER2})\}^T$$

In the outer-loop control of the present invention, if there is an error in one piece of data, the reference SIR is increased by Sinc. If there is no error in any piece of data when T blocks are observed, the reference SIR is decreased by Sdec. Specifically, in this case, the reference SIR is increased by Sinc with a probability of $1-\{(1\text{-BLER1})\times(1\text{-BLER2})\}^T$ and is decreased by Sdec with a probability of $\{(1\text{-BLER1})\times(1\text{-BLER2})\}^T$.

In a stable state, since the increment and decrement of an average reference SIR are equal, the following equation holds true.

$$[1-\{(1\text{-}BLER1)\times(1\text{-}BLER2)\}^T]\times Sinc=\{(1\text{-}BLER1)\times(1\text{-}BLER2)\}^T\times Sdec \quad (2)$$

Figure 7:
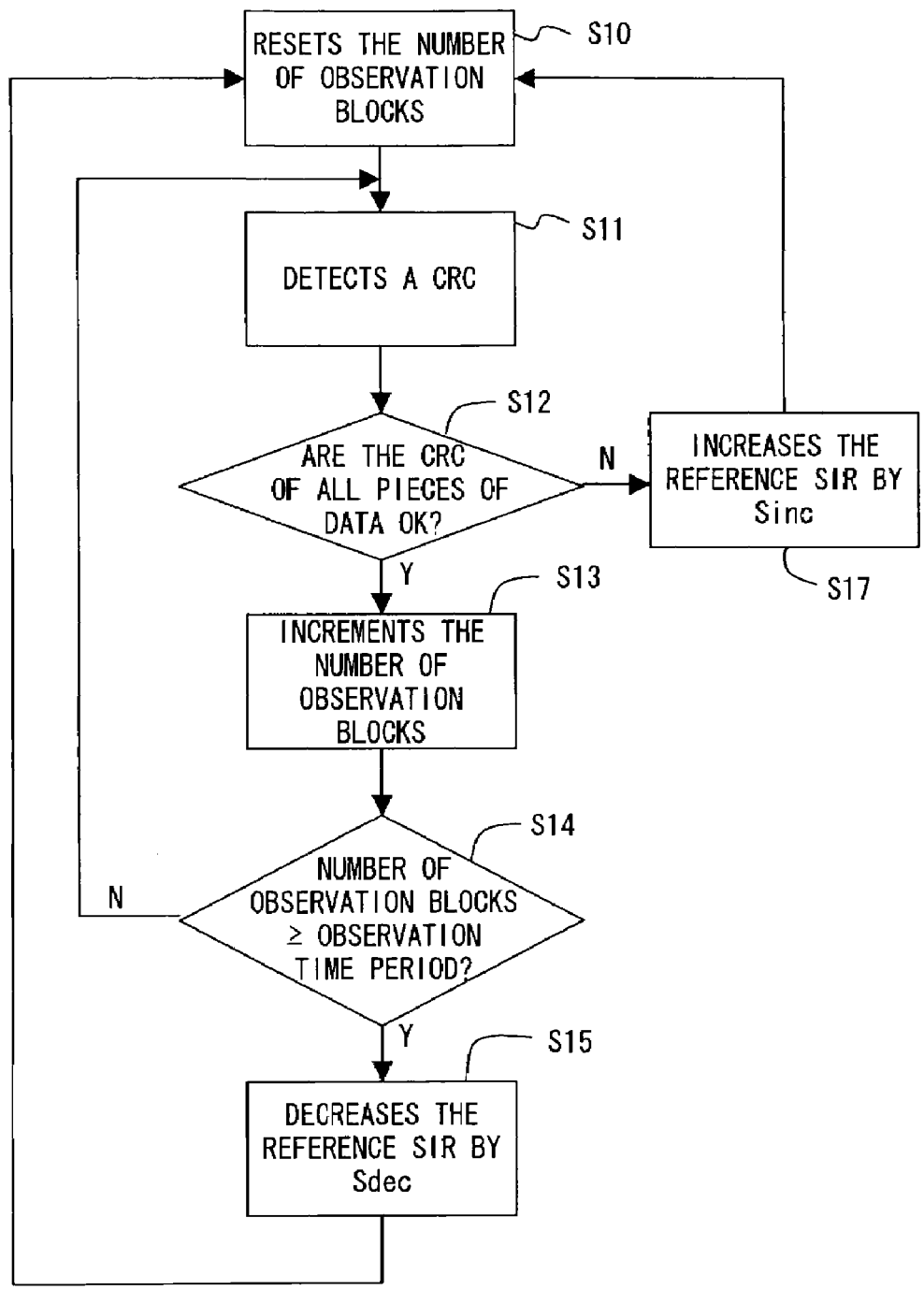
FIG. 7 is a flowchart showing the process in the second preferred embodiment of the present invention.

FIG. 7 is a flowchart showing the process of the second preferred embodiment of the present invention.

First, in step S10, the number of observation blocks of the counter is reset. In step S11, a CRC is detected. Then, in step S12, it is judged whether there is no CRC error in all pieces of data. If there is a CRC error, in step S17 the reference SIR is increased by Sinc, and the process returns to step S10. If it is judged that there is no CRC error in any piece of data, in step S13 the number of observation blocks is incremented and in step S14 it is judged whether the number of observation blocks exceeds that of the observation time period. If the judgment in step S14 is no, the process returns to step S11. If the judgment in step S14 is yes, in step S15 the reference SIR is decreased by Sdec, and the process returns to step S10.

FIG. 8 shows the configuration of the second preferred embodiment.

Although in FIG. 8, a plurality of decoders and a plurality of CRC detectors are provided, the process can also be performed in a time-divisional manner using one decoder and one CRC detector.

A signal transmitted from the base station 11 is demodulated by the demodulator 12 of the mobile station 10 and is divided into a plurality of channels. Each channel is inputted to a corresponding decoder 15, and after the decoding, a corresponding CRC detector 16 detects an error. Then, the error detection result is inputted to the reference SIR control unit 17. The reference SIR control command determination unit 20 obtains the values of T, Sinc, and Sdec using both DSP 18 and conversion table 19, and stores the values in the register. Then, the reference SIR is increased/decreased by the reference SIR increase/decrease control unit according to the flowchart described earlier (the counter counts the number of observation blocks) and inputs the obtained reference SIR to the comparator 14. The comparator 14 compares the SIR measurement value from the SIR measurement unit 13 with the reference SIR and generates/transmits a TPC command.

Figure 9:
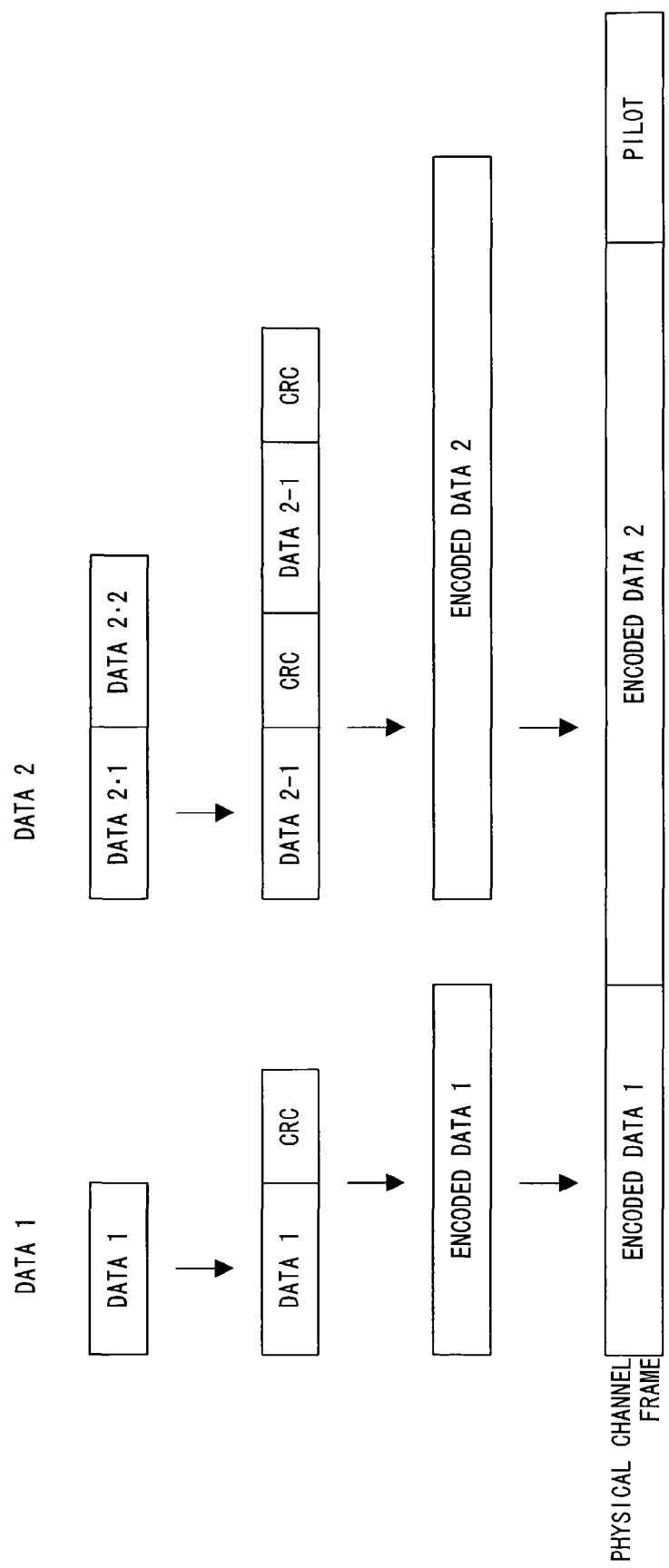
FIG. 9 shows the data process in the third preferred embodiment of the present invention.

FIG. 9 shows the process in the third preferred embodiment of the present invention.

If a plurality of pieces of data are multiplexed in one physical channel, if the number of blocks included in a unit time period is different for each piece of data, and if there is no error in any piece of data during the observation time period, the reference SIR is decreased by Sdec. If there is an error in one piece of data, the reference SIR is increased by Sinc when an error occurs.

For convenience' sake, a case where two pieces of data are multiplexed, and the first and second piece of data include one block and two blocks, respectively, of data per unit time period, is described.

In FIG. 9, data 1, and two pieces of data 2-1 and 2-2 are multiplexed in the frame of one physical channel. After a CRC bit is attached to each piece of data, the data are encoded and constituted into one physical frame. The physical frame is composed of the encoded pieces of data 1 and 2, and a pilot signal.

It is assumed that the target block error rates of the first and second data are BLER1 and BLER2, respectively.

Since a probability that there may be no error in all pieces of data is $(1\text{-BLER1})\times(1\text{-BLER2})^2$, a probability that there may be no error in all pieces of data when the data are observed during time T assuming that an observation time period is T is as follows.

$$\{(1\text{-BLER1})\times(1\text{-BLER2})^2\}^T$$

However, a probability that there may be an error in one piece of data is obtained as follows by subtracting the equation from 1.

$$1-\{(1\text{-BLER1})\times(1\text{-BLER2})^2\}^T$$

In the outer-loop control of the present invention, if there is an error in one piece of data, the reference SIR is increased by Sinc. If there is no error in any piece of data when data are observed for time period T, the reference SIR is decreased by Sdec. Specifically, the reference SIR is increased by Sinc with a probability of $1-\{(1\text{-BLER1})\times(1\text{-BLER2})^2\}^T$, and is decreased by Sdec with a probability of $\{(1\text{-BLER1})\times(1\text{-BLER2})^2\}^T$.

In a stable state, since the increment and decrement of an average reference SIR are equal, the following equation holds true.

$$[1-\{(1\text{-}BLER1)\times(1\text{-}BLER2)^2\}^T]\times Sinc=(1\text{-BLER1})\times(1\text{-BLER2})^2\}^T\times Sdec \quad (3)$$

T, Sinc, and Sdec such that equation (3) can hold true are set.

Figure 10:
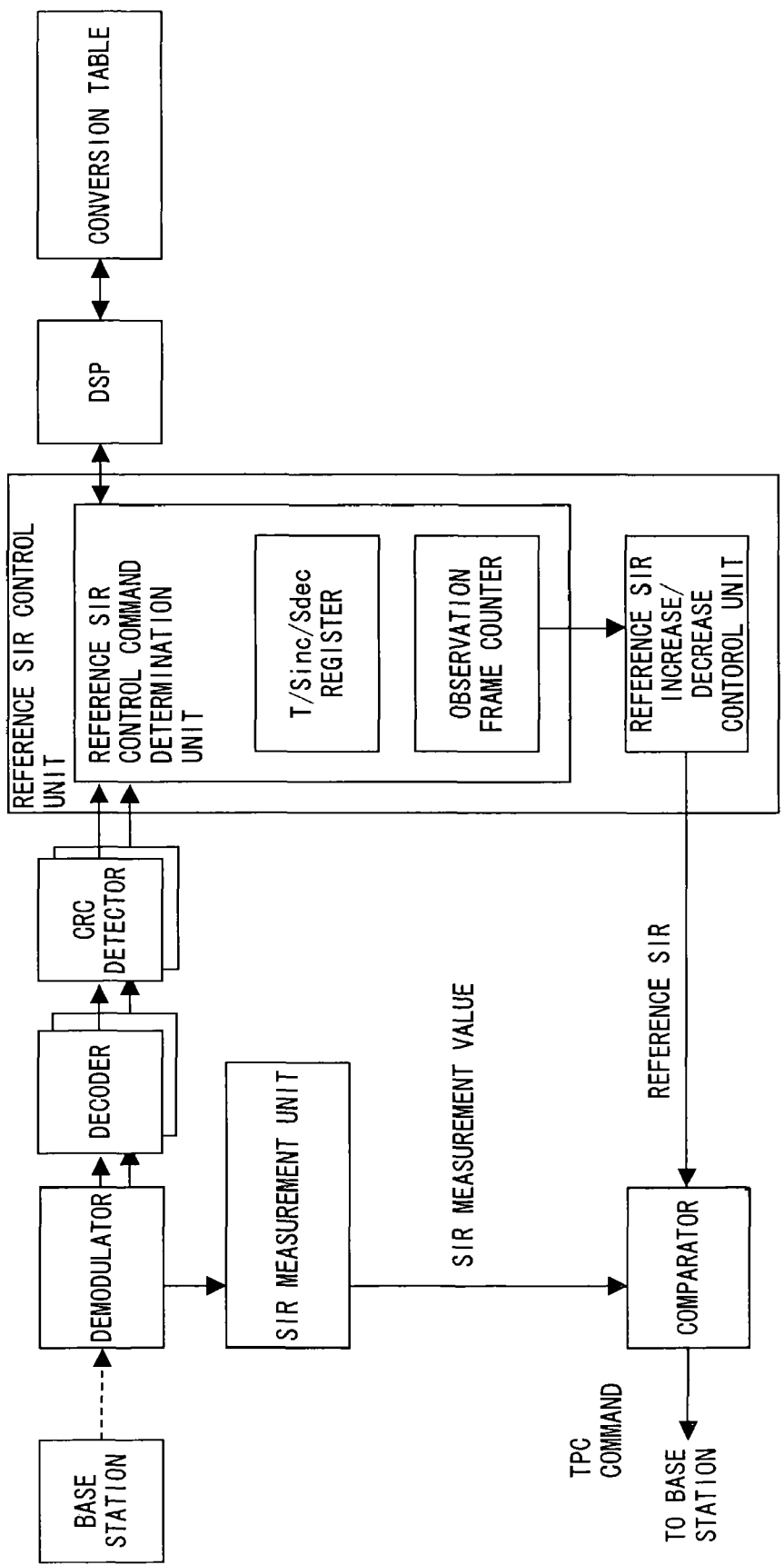
FIG. 10 shows the configuration of the device in the third preferred embodiment.

FIG. 10 shows the configuration of the device in the third preferred embodiment.

Since the configuration shown in FIG. 10 is almost the same as that of the device in the second preferred embodiment, the overlapping description is omitted below.

In the third preferred embodiment, the number of blocks included in each frame is different, a counter for counting an observation time period counts the number of frames. Since conditions to be met by control parameters are different from that of the second preferred embodiment, T, Sinc, and Sdec stored in the conversion table are also different from those of the second preferred embodiment.

Figure 11:
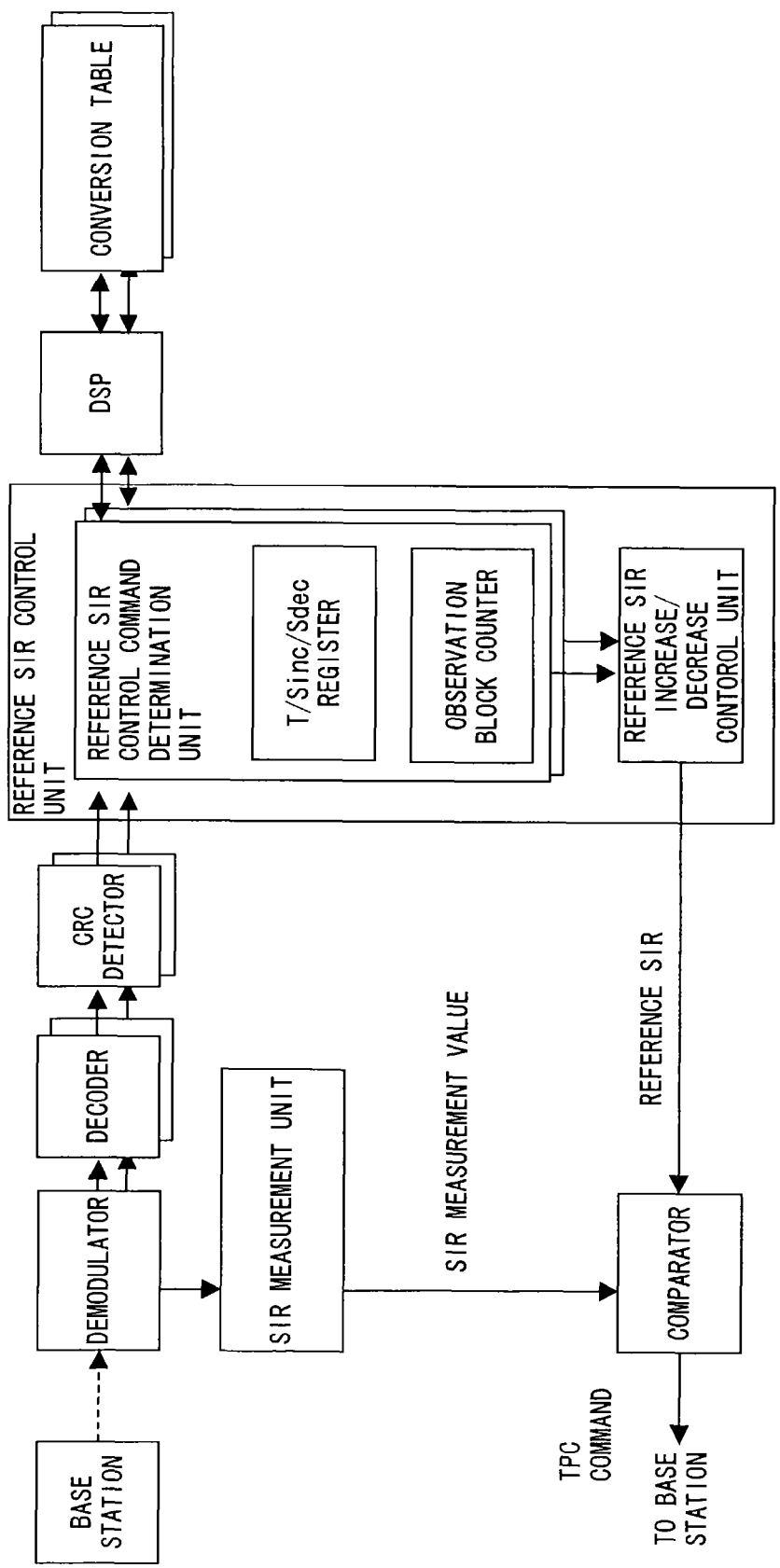
FIG. 11 shows the configuration of the device in the fourth preferred embodiment.

FIG. 11 shows the configuration of the device in the fourth preferred embodiment of the present invention.

In the following description, only parts different from FIG. 1 are described.

If a plurality of pieces of data are multiplexed in one physical channel (one physical frame), observation time period T, reference SIR increment Sinc, by which the reference SIR is increased at the time of reference SIR update control and reference SIR decrement Sdec, by which the reference SIR is decreased at the time of reference SIR update control are independently set for each piece of data, the block error rate of each piece of data is independently monitored, and the control algorithm shown in FIG. 4 is executed for each piece of data.

In this case, if it is assumed that the data number of each piece of data, the number of blocks during an observation time period, a reference SIR increment, and a reference SIR decrement are i, $T_i$, $Sinc_i$, and $Sdec_i$, respectively, a probability that there is no error in one block is $(1-BLER_i)$. Therefore, a probability that there may be no error throughout all blocks $T_i$ can be as follows.

$$(1-BLER_i)^{Ti}$$

However, a probability that there may be an error during the observation time period can be obtained as follows by subtracting the equation from 1.

$$1-(1-BLER_i)^{Ti}$$

In a stable state, the following equation holds true.

$$\{1-(1-BLER_i)^{Ti}\} \times Sinc_i = (1-BLER_i)^{Ti} \times Sdec_i$$

The observation time period $T_i$, reference SIR increment $Sinc_i$, and reference SIR decrement $Sdec_i$ of each piece of data are set in such a way that this equation can hold true.

Then, if by CRC detection, the $Sinc_j$ of a specific piece of data i and the $Sdec_j$ of a specific piece of data k are obtained, the update of the reference SIR can be calculated according to the following equation.

New reference $SIR$=Old reference $SIR+\Sigma_j Sinc_j - \Sigma_k Sdec_k$

In this preferred embodiment, since control parameters $T_i$, $Sinc_i$, and $Sdec_i$ are independently set, the same number of reference SIR control command determination units as data channels are provided. If an error is detected in a CRC or if an observation time period comes to an end, the reference SIR control command determination unit issues a command to designate both the increase/decrease of the reference SIR and an increment/decrement to the reference SIR increase/decrease control unit. The reference SIR increase/decrease control unit updates the reference SIR using the reference SIR update equation described above, according to the command designated by the reference SIR control command determination unit of each data channel and transmits the updated reference SIR to the comparator.

FIG. 12 shows the configuration of the device in the fifth preferred embodiment of the present invention.

If a plurality of pieces of data are multiplexed in one physical channel (one physical frame) and also each piece of data has a different number of blocks included during a unit time period, observation time period T, reference SIR increment Sinc, by which the reference SIR is increased at the time of reference SIR update control and reference SIR decrement Sdec, by which the reference SIR is decreased at the time of reference SIR update control are independently set for each piece of data, the block error rate of each piece of data is independently monitored and the control algorithm shown in FIG. 4 is executed for each piece of data.

In this case, if each data number, the number of blocks included during a unit time period (one observation time period), an observation time period, a reference SIR increment, and a reference SIR decrement are assumed to be i, $N_i$, $T_i$, $Sinc_i$, and $Sdec_i$, respectively, a probability that there may be no error in one block is $(1-BLER_i)$. Therefore, a probability that there may be no error during an observation time period becomes as follows.

$$(1-BLER_i)^{Ni \times Ti}$$

However, a probability that there may be an error during the observation time period can be obtained as follows by subtracting the equation from 1.

$$1-(1-BLER_i)^{Ni \times Ti}$$

In a stable state, the following equation holds true.

$$\{1-(1-BLER_i)^{Ni \times Ti}\} \times Sinc_i = (1-BLER_i)^{Ni \times Ti} \times Sdec_i$$

The observation time period $T_i$, reference SIR increment $Sinc_i$ and reference SIR decrement $Sdec_i$ of each piece of data are set in such a way that this equation can hold true. Then, the reference SIR value is updated using a reference SIR update equation as described about the fourth preferred embodiment.

The configuration of the device in the fifth preferred embodiment is almost the same as that of the device in the fourth preferred embodiment. Since the number of blocks included in each frame is different, the counter counts the number of frames instead of an observation time period. Since a conditional expression to be met by control parameters is different, the T, $Sinc_i$, and $Sdec_i$ values stored in the conversion table are different than those of the fourth preferred embodiment.

FIGS. 13 through 16 show the sixth preferred embodiment of the present inventions.

Figure 16:
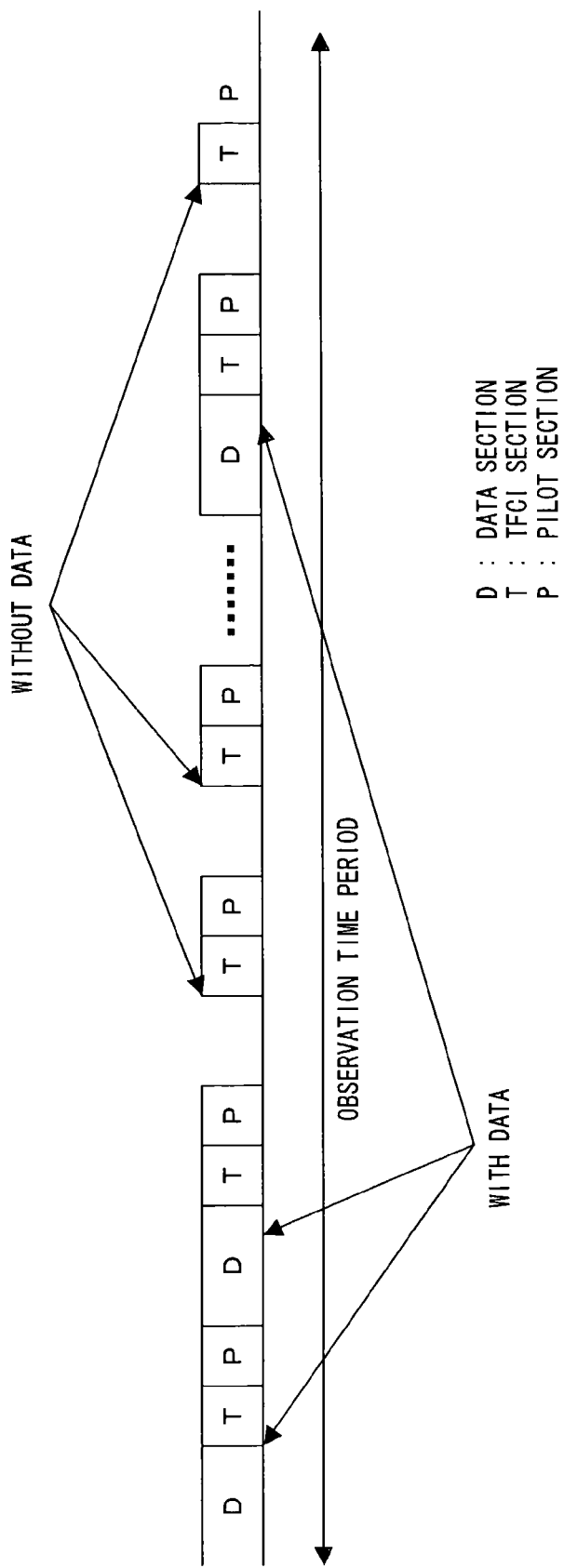
FIG. 16 shows the sixth preferred embodiment of the present invention (No.4).

In the case of the transmission/reception of packet or control information, blocks are sometimes transmitted/received irregularly (at intervals) as shown in FIG. 16 instead of continuously. In such a case, even if observation time period T is constant, the number of blocks transmitted/received during observation time period T is not constant.

In such a case, both a probability that there may be an error during observation time period T and a probability that there may be no error during observation time period T vary depending on the observation time period. In this case, the conditions to be met by Sinc and Sdec vary depending on the number of blocks received during the observation time period.

If the number of blocks received during a specific observation time period is assumed to be B, conditions to be met by target block error rate BLER, the number of received blocks B, increment Sinc at the time of reference SIR update control, and decrement Sdec at the time of reference SIR update control, become as follows.

$$\{1-(1-BLER)^B\} \times Sinc = (1-BLER)^B \times Sdec$$

In this case, reference SIR increment Sinc is preset prior to the commencement of communications, and if there is an error before the set observation time period T comes to an end, the reference SIR is increased by Sinc. If there is no error before the set observation time period T comes to an end, Sdec is calculated based on the number B of blocks received during the observation time period and the reference SIR is decreased by Sdec.

Alternatively, Sinc values or Sdec values of a target BLER can be stored in a table format, one of the parameters can be read from the table and the DSP can calculate the remaining one parameter using both the number of received blocks B and Sinc or Sdec.

As described above, if blocks are discontinuously transmitted/received as in packet communications, the number of receiving blocks must be counted. Whether a block is transmitted/received is judged based on a TFCI (Transport Format Combination Indicator) signal that is multiplexed as overhead as shown in FIG. 16.

Figure 13:
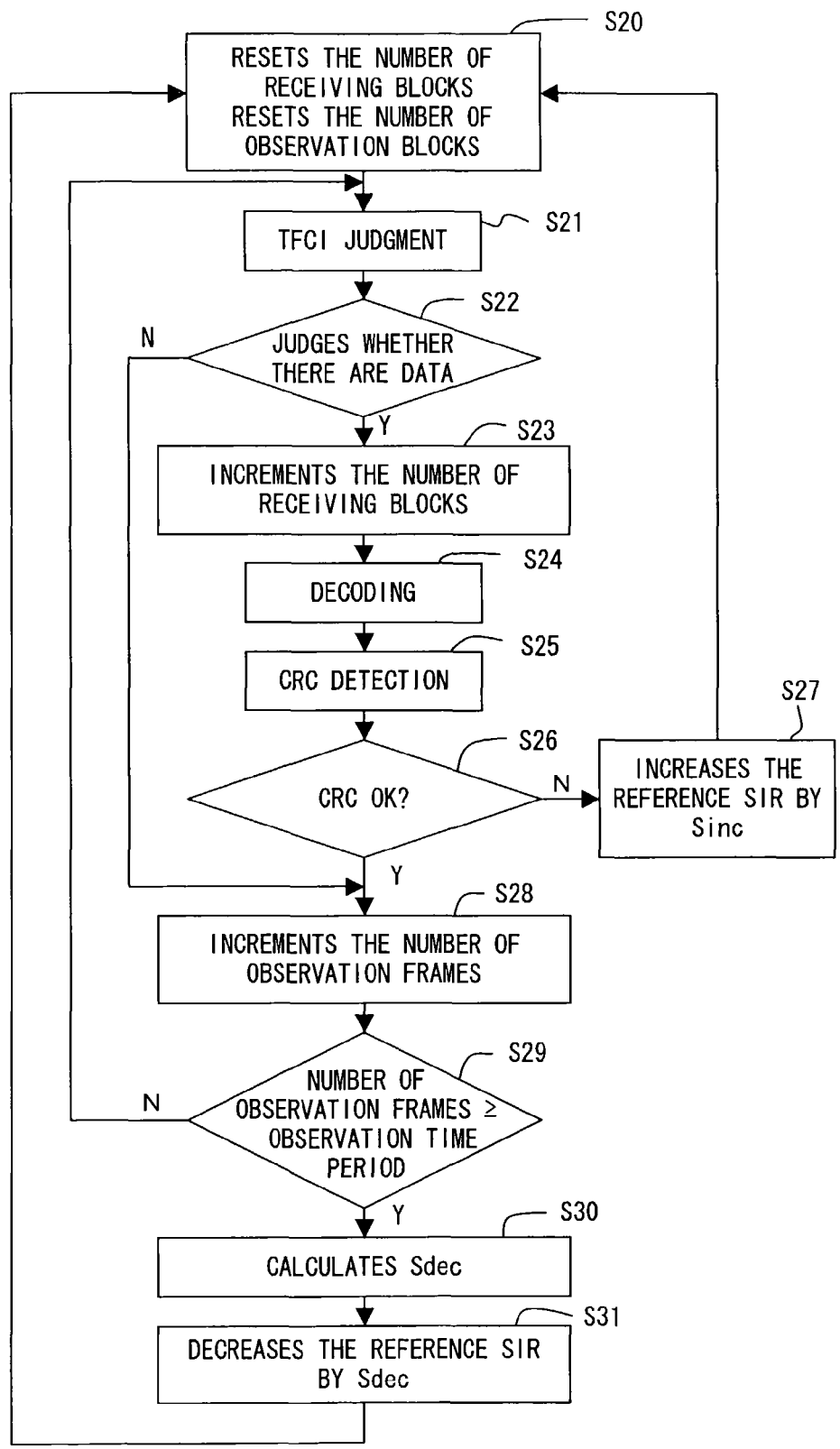
FIG. 13 shows the sixth preferred embodiment of the present invention (No.1).

FIG. 13 is a flowchart showing the process of the sixth preferred embodiment.

First, in step S20, both the number of receiving blocks and the number of observed blocks are reset. Then, in step S21 the TFCI is judged and in step S22 it is judged whether there are data. If there are no data, the process proceeds to step S28. If there are data, in step S23 the number of receiving blocks is incremented and in step S24 the data are decoded. Then, in step S25 a CRC is detected. If in step S26, it is judged that there is an error, in step S27 the reference SIR is increased by Sinc and the process returns to step S20. If in step S26 it is judged that there is no error, in step S28 the number of observed frames is incremented. Then, in step S29 it is judged whether the number of observed frames exceeds that of the observation time period. If the judgment in step S29 is no, the process returns to step S21. If the judgment in step S29 is yes, in step S30 Sdec is obtained by calculation and the like, and in step S31 the reference SIR is decreased by Sdec. Then, the process returns to step S20 and the process is repeated.

FIG. 14 shows the concept of one example process for calculating both Sinc and Sdec, based on a target BLER.

First, the DSP receives either Sinc or Sdec by transferring a target BLER to the conversion table. Then, the DSP calculates the remaining one according to the operation expression described above using both the number of receiving blocks and Sinc or Sdec, and transfers the target BLER, Sinc, and Sdec to the reference SIR control unit.

Figure 15:
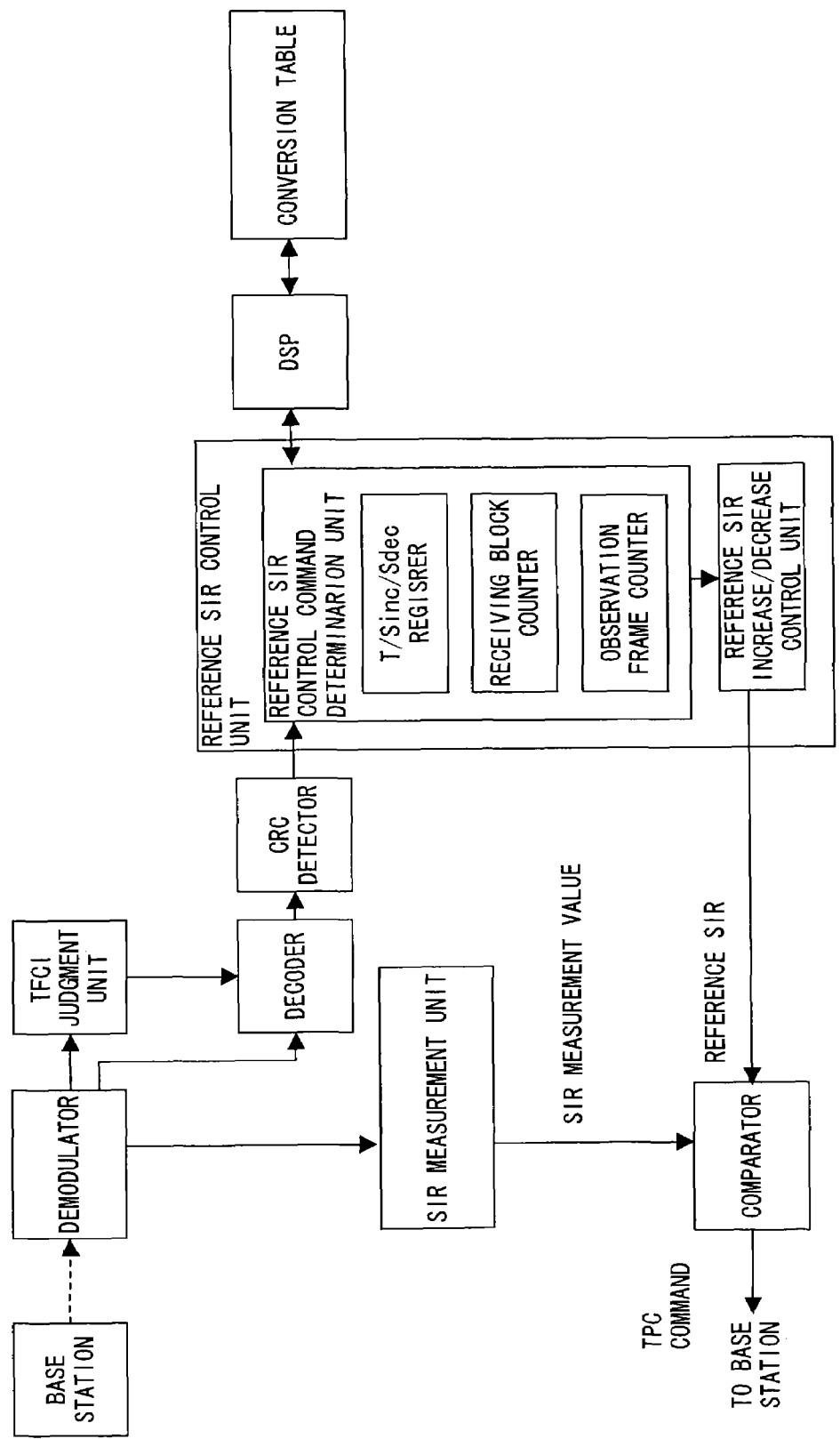
FIG. 15 shows the sixth preferred embodiment of the present invention (No.3).

FIG. 15 shows an example configuration of the device in the sixth preferred embodiment.

In the description of FIG. 15, only parts different from FIG. 1 are described.

In FIG. 15, a TFCI judgment unit and a receiving block counter are provided, and an observation frame counter is also provided instead of the observation block counter. The TFCI judgment unit analyzes a TFCI. If it is judged that there are receiving data, the TFCI judgment unit decodes the receiving data and detects a CRC. If an error is detected, the reference SIR is increased by the outer-loop control.

If it is judged that there are receiving data, in the reference SIR control unit, the number of receiving blocks is incremented. The number of observation frames is also incremented regardless of whether there are data.

If the number of observation frames exceeds that during the observation time period, the reference SIR control unit notifies the DSP of the number of receiving blocks. The DSP calculates both the number of receiving blocks and Sinc or Sdec, and the reference SIR control unit decreases the reference SIR by the outer-loop control. If the number of observation frames does not reach that during the observation time period, the data of a subsequent frame are processed.

Figure 17:
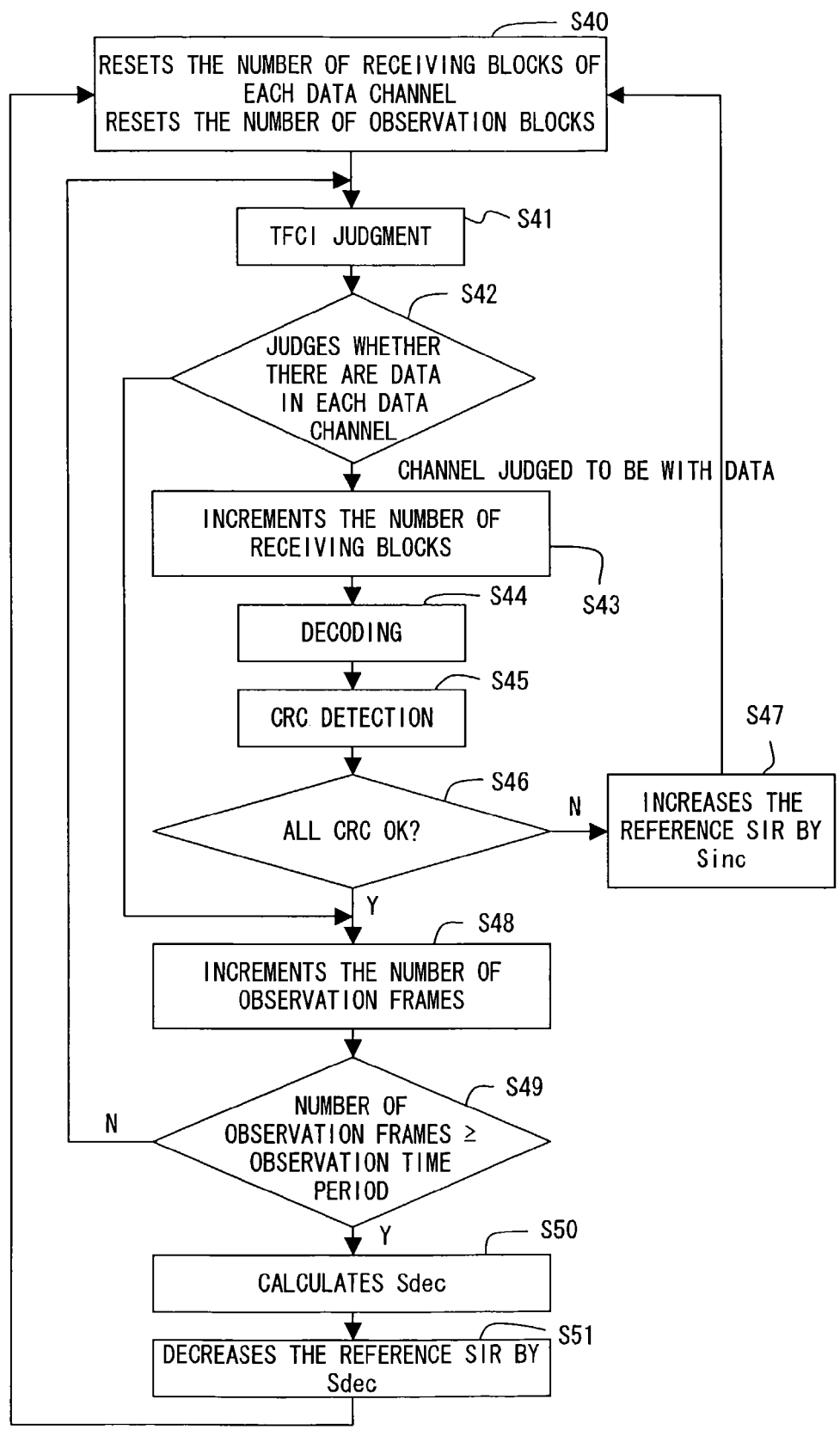
FIG. 17 shows the seventh preferred embodiment of the present invention (No.1).
Figure 18:
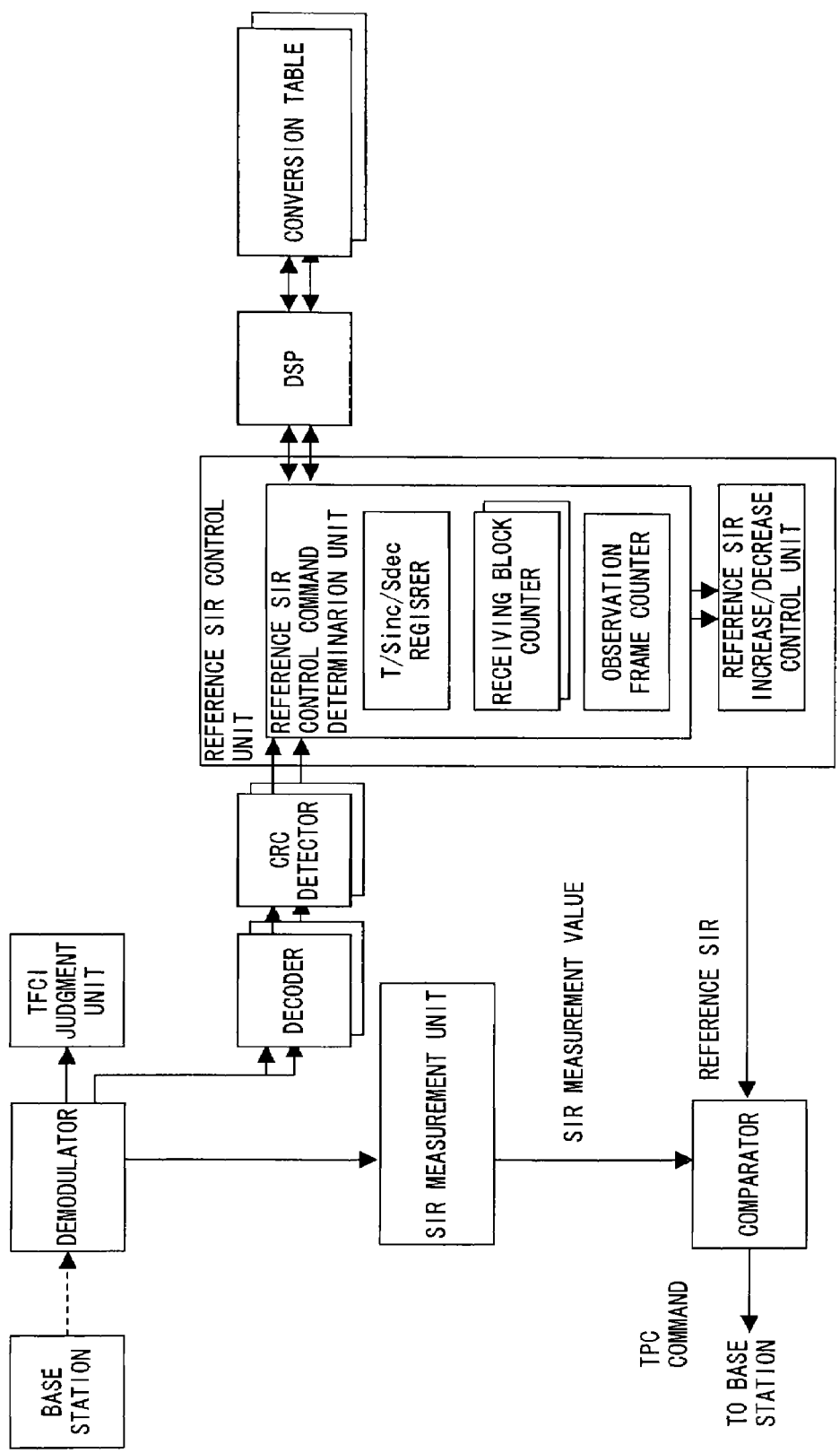
FIG. 18 shows the seventh preferred embodiment of the present invention (No.2).

FIGS. 17 and 18 show the seventh preferred embodiment of the present invention.

If a plurality of pieces of data are multiplexed in one physical channel (one physical frame) and also the blocks of each piece of data are irregularly transmitted/received, the number of the blocks of data transmitted/received during observation time period T common to all pieces of data varies depending on the data or an observation time period. In such a case, the conditions met by Sinc and Sdec vary depending on the number of blocks of each piece of data received during the observation time period.

If the number of blocks received by each piece of data during the observation time period is assumed to be $B_i$, conditions to be met by the target block error rate $BLER_i$, the number of received blocks $B_i$, increment Sinc at the time of reference SIR update control, and decrement Sdec at the time of reference SIR update control, for each piece of data become as follows.

$$\left[1 - \prod_i (-BLERi)^{Bi}\right] \times Sinc = \prod_i (1 - BLERi)^{Bi} \times Sdec$$

In this case, reference SIR increment Sinc is preset prior the commencement of communications. If there is an error during the preset observation time period T, the reference SIR is increased by Sinc. If there is no error during the preset observation time period T, Sdec is calculated based on the number of blocks Bi received during the observation time period.

FIG. 17 is a flowchart showing the process of the seventh preferred embodiment.

First, in step S40, both the number of receiving blocks of each piece of data and the number of observation frames are reset. In step S41, a TFCI is judged, and in step S42 it is judged whether there are data for each data channel. If it is judged there are no data, the process proceeds to step S48. If it is judged there is data, in step S43 the number of receiving blocks is incremented and in step S44 the data are decoded. Then, in step S45 a CRC is detected. Then, in step S46 it is judged whether there is no error in all data channel CRCS. If it is judged that there is even one error, in step S47 the reference SIR is increased by Sinc and the process returns to step S40. If in step S46 it is judged that there is no error in all data channels, the process proceeds to step S48.

In step S48, the number of the observation frames is incremented and in step S49 it is judged whether the number of the observation frames exceeds that during the observation time period. If the judgment in step S49 is no, the process returns to step S41. If the judgment in step S49 is yes, in step S50 Sdec is calculated and in step S51 the reference SIR is decreased by Sdec.

FIG. 18 shows the configuration of the device of the seventh preferred embodiment. Only parts different from FIG. 15 are described below.

In FIG. 18, the same number of decoders and CRC detectors as the number of data channels are provided. Since control parameters are common to all data channels, only one reference SIR control command determination unit is provided. However, since the number of receiving blocks varies with a data channel, the same number of receiving block counters as data channels are needed.

Figure 19:
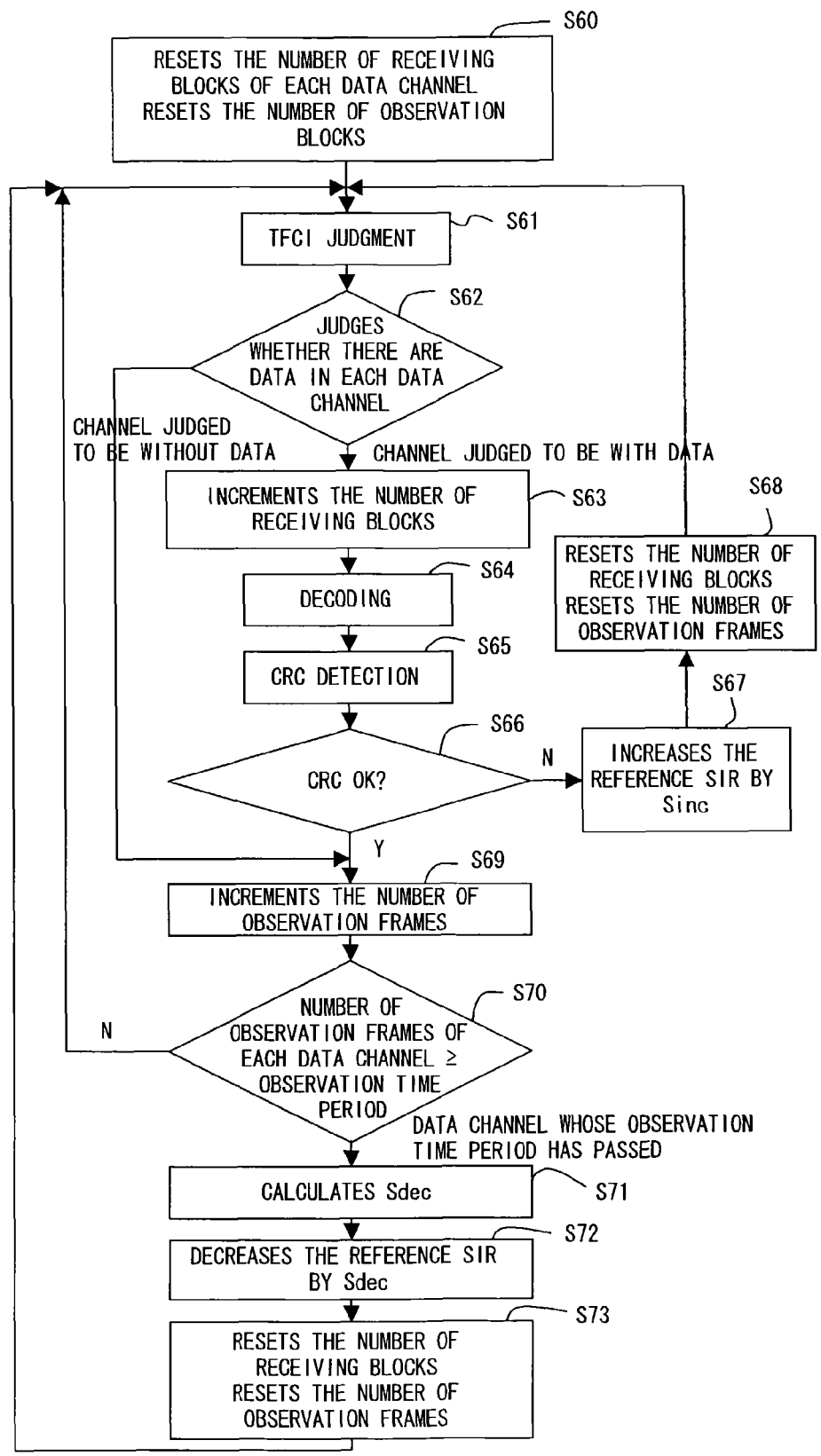
FIG. 19 shows the eighth preferred embodiment of the present invention (No.1).
Figure 20:
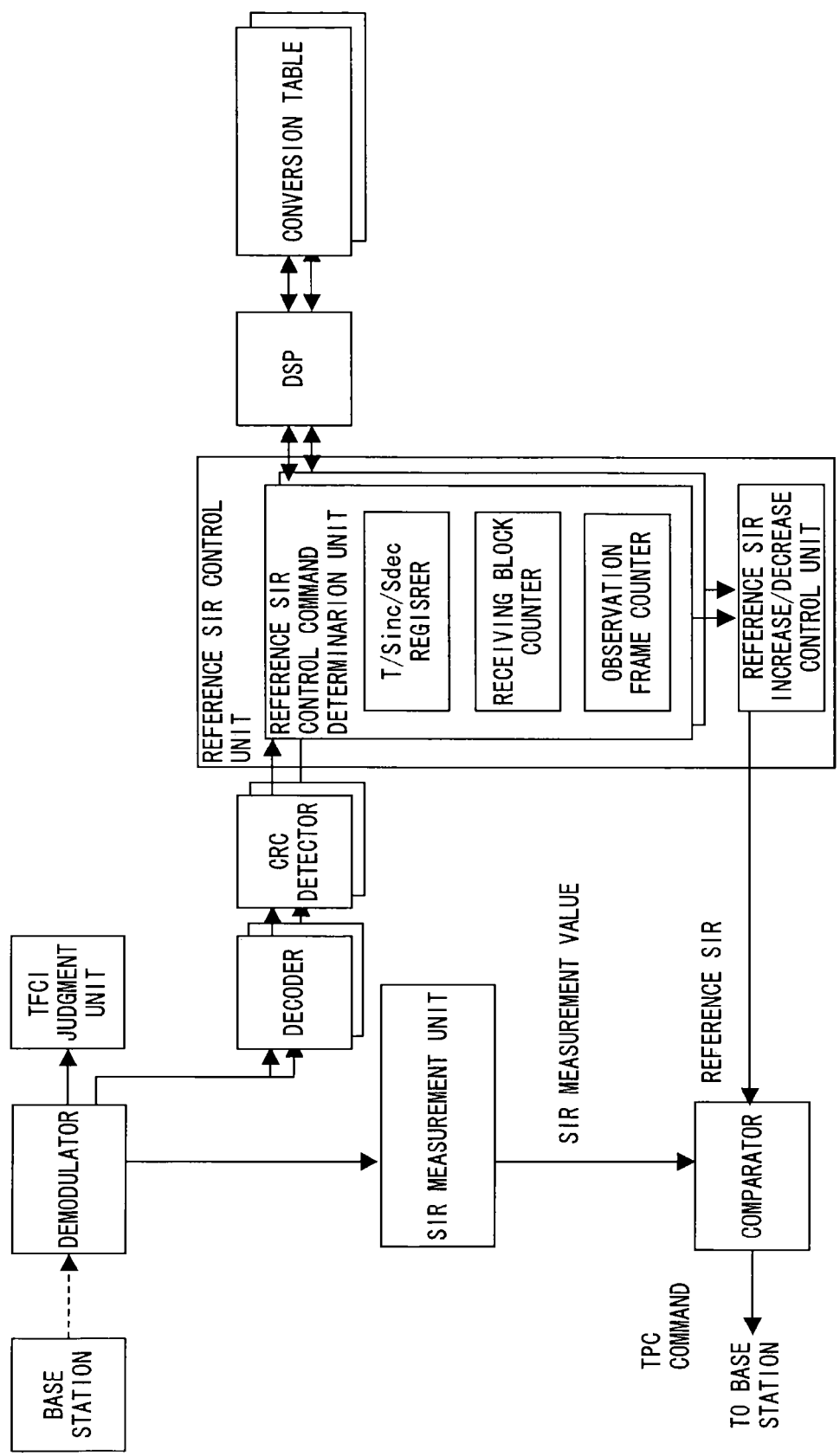
FIG. 20 shows the eighth preferred embodiment of the present invention (No.2).

FIGS. 19 and 20 show the eighth preferred embodiment.

If a plurality of pieces of data are multiplexed in one physical channel (one physical frame) and also the blocks of each piece of data are irregularly transmitted/received, observation time period T, increment Sinc at the time of reference SIR update control and decrement Sdec at the time of reference SIR update control of each piece of data can also be independently set.

In such a case, conditions to be met by each piece of data become as follows.

If the observation time period of data i, the number of blocks of data i received during the observation time period, increment at the time of reference SIR update control, and decrement at the time of reference SIR update control are assumed to be $T_i$, $B_i$, $Sinc_i$, and $Sdec_i$, respectively, conditions to be met by $B_i$, $Sinc_i$, and $Sdec_i$ become as follows.

$$\{1-(1-BLER_i)^{Bi}\} \times Sinc_i = (1-BLER_i)^{Bi} \times Sdec_i$$

In this case, reference SIR increment $Sinc_i$ is preset for each piece of data prior to the commencement of communications, and if there is an error during the preset observation time period $T_i$, the reference SIR is increased by $Sinc_i$. If there is no error during the preset observation time period $T_i$, $Sdec_i$ is calculated based on the number of blocks received, $B_i$, during the observation time period $T_i$, and the reference SIR is decreased by $Sdec_i$.

Specifically, the reference SIR is updated as follows.

New reference $SIR$=Old reference $SIR + \Sigma_j Sinc_j - \Sigma_k Sdec_k$

FIG. 19 is a flowchart showing the process of the eighth preferred embodiment.

In step S60, both the number of receiving blocks of each piece of data and the number of observation frames are reset. In step S61, a TFCI is judged and in step S62 it is judged whether there are data in each data channel. If it is judged that there are no data, the process proceeds to step S69. If it is judged that there are data, in step S63 the number of receiving blocks is incremented and in step S64 the data are decoded. Then, in step s65 a CRC is detected. Then, in step S66 it is judged whether there is an error. If there is an error, in step S67 the reference SIR is increased by Sinc and in step S68 both the number of receiving blocks and the number of observation frames are reset. Then, the process returns to step S61.

If in step S66 it is judged that there is no error, in step S69 the number of observation frames is incremented and in step S70 it is judged whether the number of observation frames of each data channel exceeds that of the observation time period. If the judgment in step S70 is no, the process returns to step S61. If the judgment in step S70 is yes, in step S71 Sdec is calculated and in step S72 the reference SIR is decreased by Sdec. Then, in step S73, both the number of receiving blocks and the number of observation frames are reset, and the process returns to step S61.

FIG. 20 shows the configuration of the device in the eighth preferred embodiment.

In the following description, only constituent components different from those shown in FIG. 18 are described.

In the configuration shown in FIG. 20, the same number of both decoders and CRC detectors as data channels are provided. Since control parameters are set for each data channel, the same number of reference SIR control command determination units and conversion tables as the number of data channels are also provided.

Figure 21:
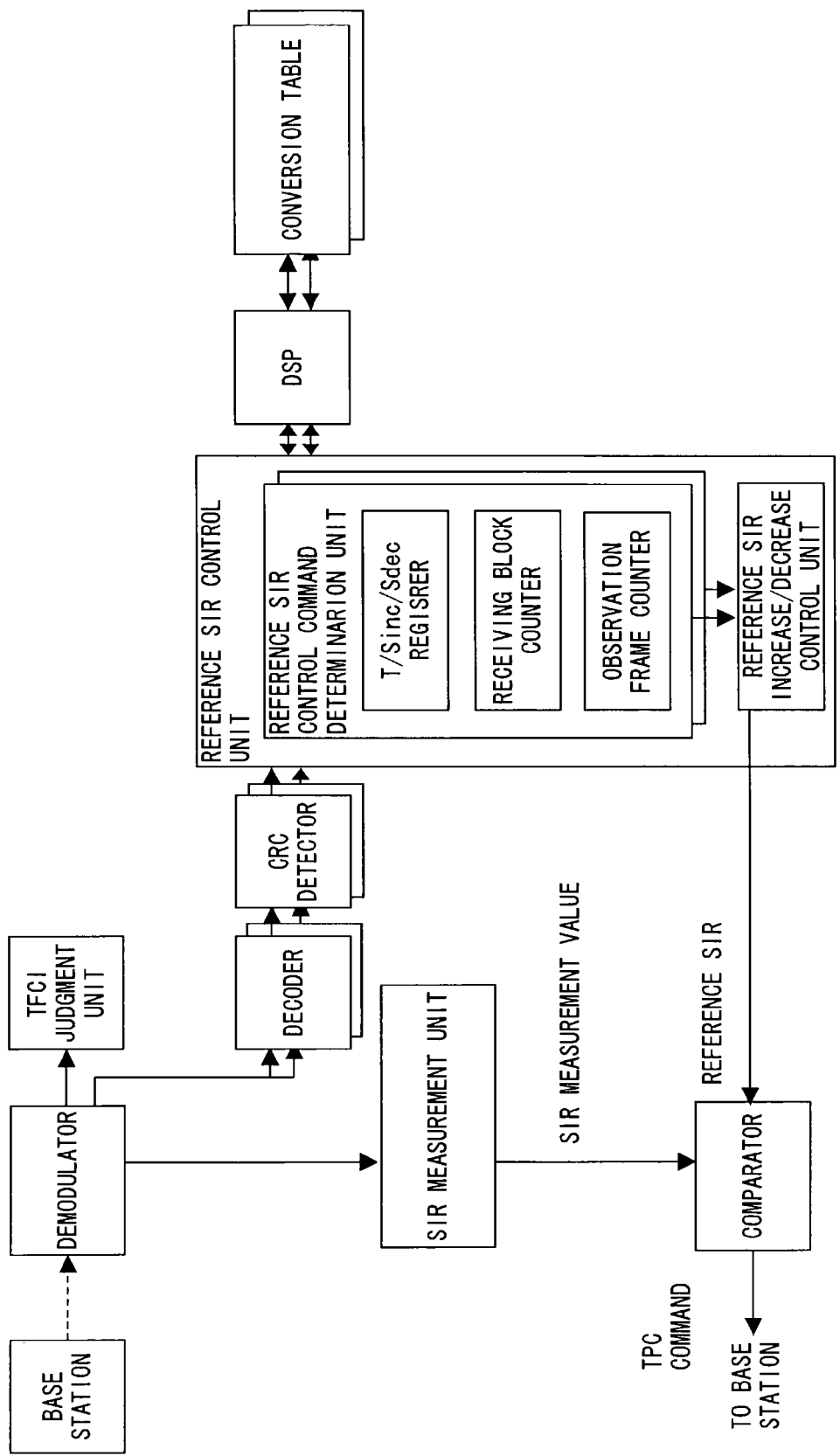
FIG. 21 shows the ninth preferred embodiment of the present invention.

FIG. 21 shows the configuration of the device in the ninth preferred embodiment.

The configuration of the ninth preferred embodiment can be organized by combining the first to eighth preferred embodiments.

Specifically, the same number of decoders, CRC detectors, reference SIR control command determination units and conversion tables as data channels to be multiplexed are provided.

However, both the decoding process and CRC detection are shared by a plurality of data channels. But, if both the decoding process and CRC detection are used in a time-divisional manner, only one decoder and only one CRC detector are acceptable.

If the reference SIR update control by outer-loop is applied to a plurality of data channels using common T, Sinc and Sdec (in the case of the second, third or seventh preferred embodiment), one set of a reference SIR control command determination unit and a conversion table are shared by the plurality of data channels. If the reference SIR update control is independently applied to each of a plurality of pieces of data channels (in the case of the fourth, fifth or eighth preferred embodiment), a different set of reference SIR control command determination units and conversion tables are used for each data channel.

Furthermore, if blocks are continuously transmitted/received (in one case of the first to fifth preferred embodiments), the number of observation frames and the number of receiving blocks are the same or proportional to each other. Therefore, either receiving block counters or observation frame counters are sufficient.

However, since blocks are discontinuously transmitted/received as in packet communications (in one case of the sixth to eighth preferred embodiments), there is no fixed relation between the number of observation frames and the number of receiving blocks. Therefore, both observation frame counters for checking the end of the observation time period and receiving block counters used for the calculation of control parameters are needed.

Figure 22:
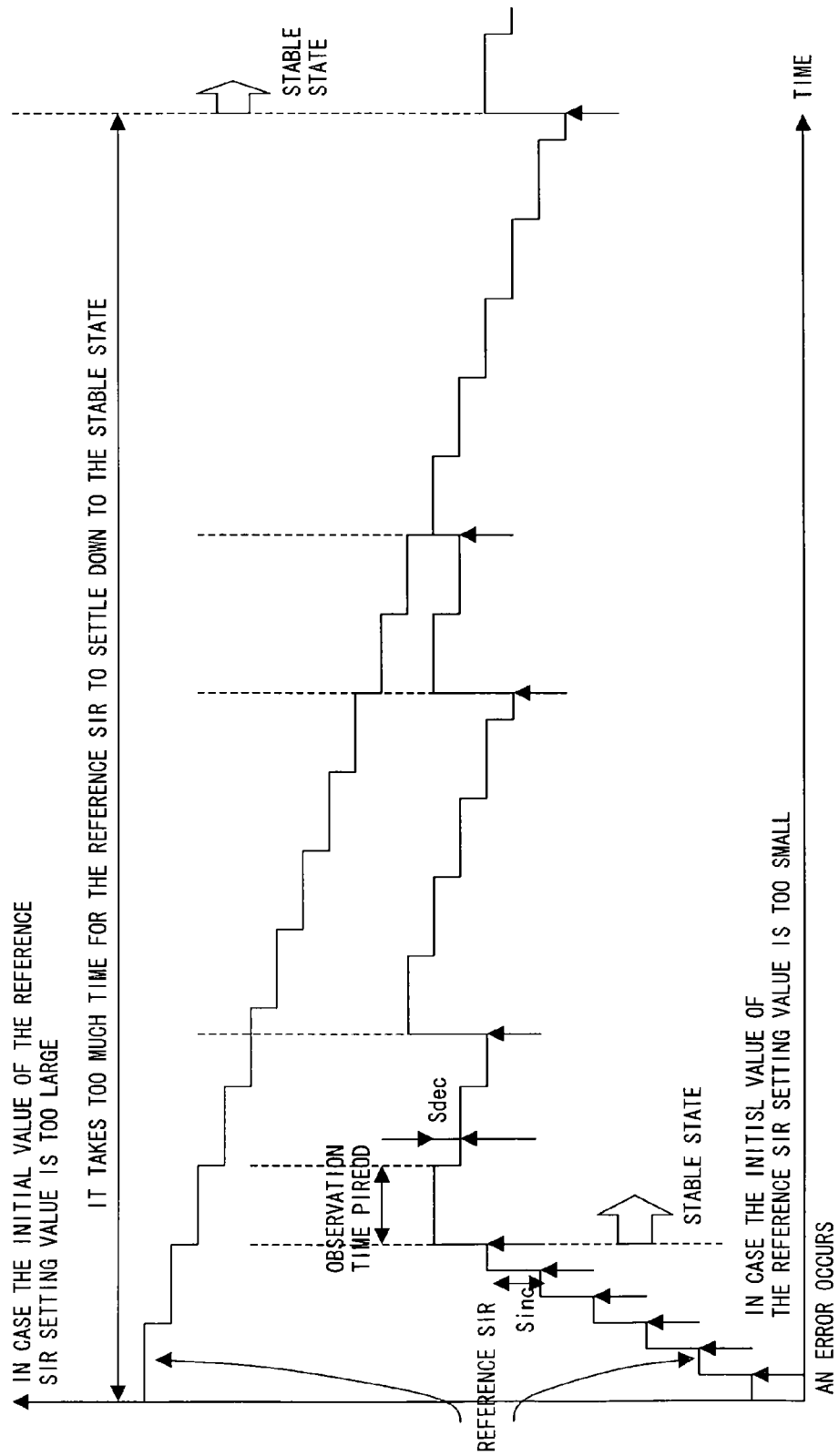
FIG. 22 shows the problems of the update method in the initial state of the reference SIR in outer-loop control.

FIG. 22 shows the problems of the update method in the initial state of the reference SIR in outer-loop control.

Specifically, if the initial setting value of the reference SIR is too large, in each preferred embodiment, Sdec is decreased after the lapse of the observation time period. Therefore, the reference SIR is not updated until each observation time period elapses. Therefore, it takes too much time for the reference SIR to settle down to a stable value. If the initial setting value of the reference SIR is too small, the reference SIR is increased by Sinc when an error occurs. Although the reference SIR increases sooner than when it decreases, Sinc sometimes becomes larger than Sdec. Therefore, it also takes time for the reference SIR to settle down to a stable state.

Figure 23:
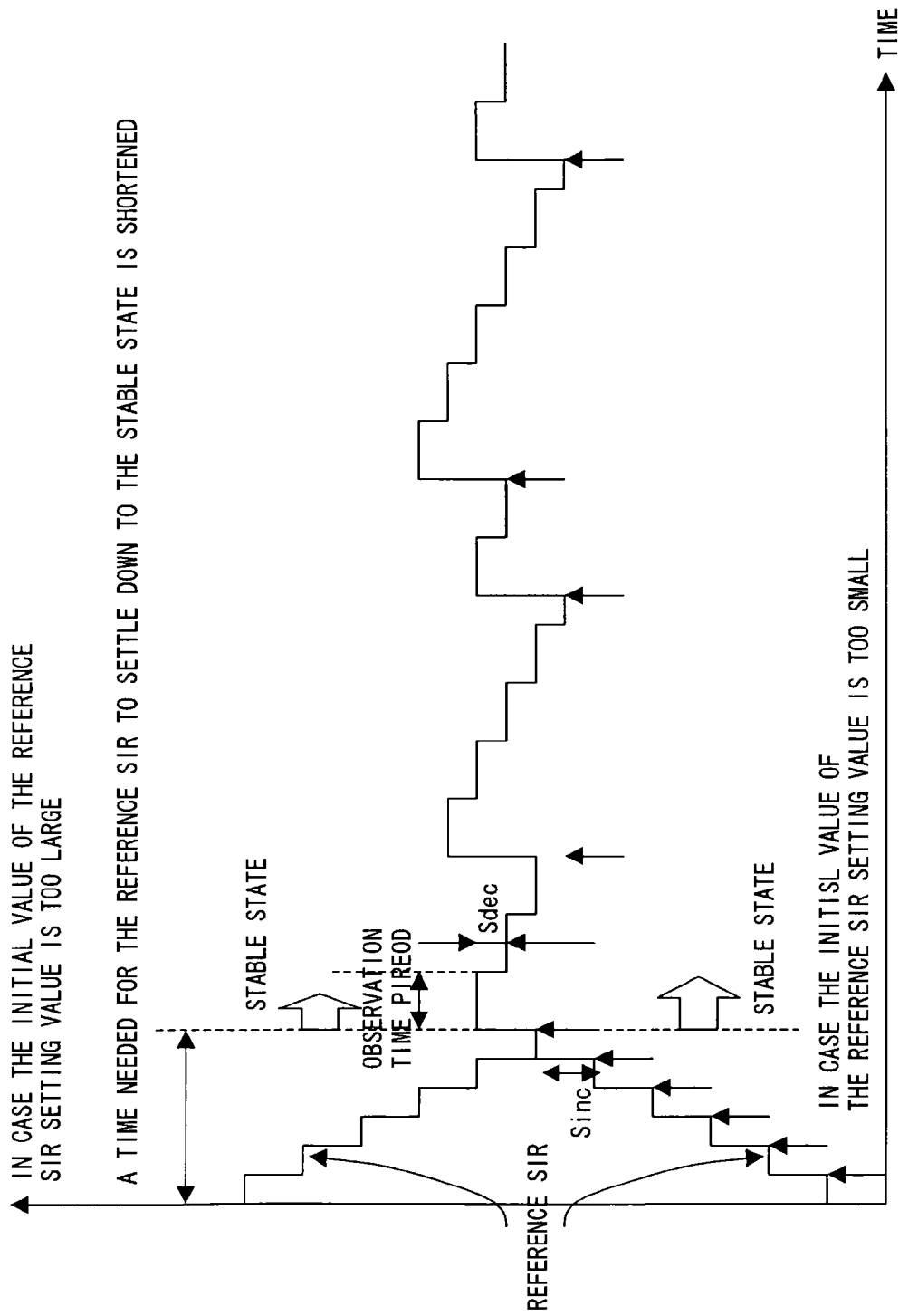
FIG. 23 shows the typical change of the reference SIR in outer-loop control in the tenth preferred embodiment of the present invention.

FIG. 23 shows the typical change of the reference SIR in outer-loop control in the tenth preferred embodiment of the present invention.

According to the tenth preferred embodiment, a special value is set as the update step value of the reference SIR in an initial state. Therefore, even if the initial value of the reference SIR is too large or too small, a time needed to settle down to a stable state can be shortened. In particular, the reference SIR can be settled down to a stable state more rapidly by performing the update in the initial state for each frame. Therefore, stable and high-quality communications can be rapidly implemented.

Figure 24:
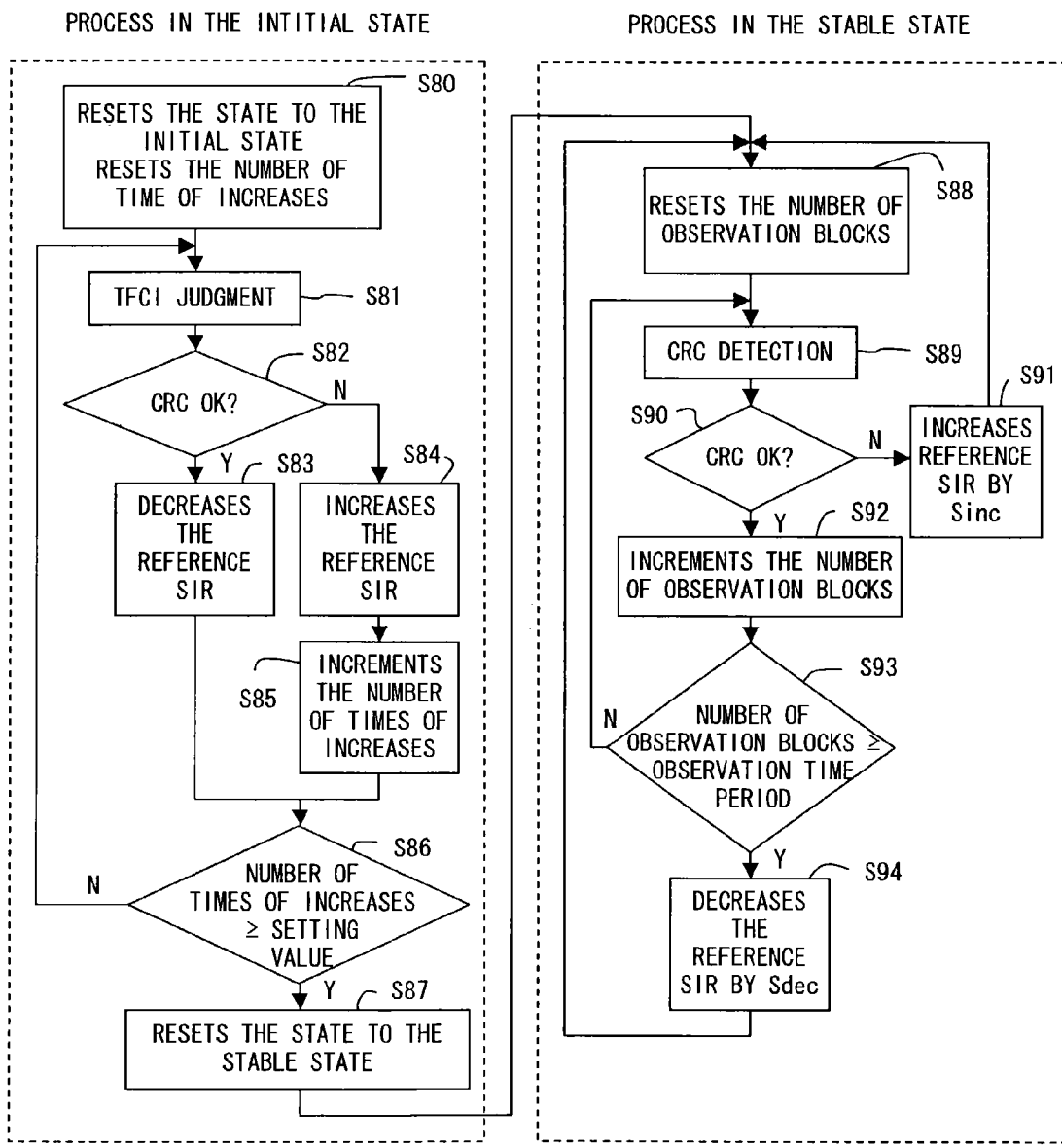
FIG. 24 shows the tenth preferred embodiment of the present invention (No. 1).
Figure 25:
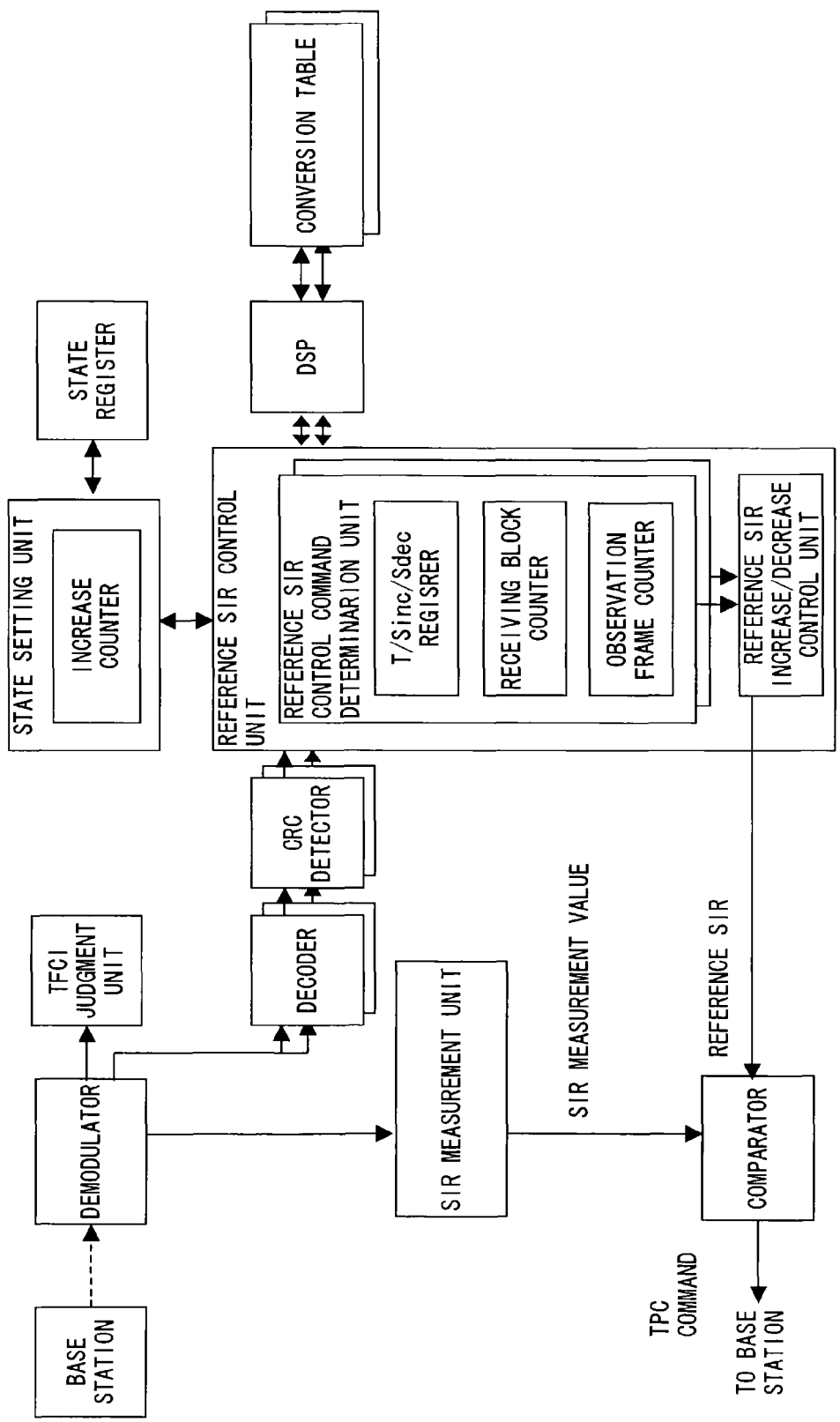
FIG. 25 shows the tenth preferred embodiment of the present invention (No. 2).

FIGS. 24 and 25 show the tenth preferred embodiment of the present invention.

In the initial state of communications, the set reference SIR sometimes is too large to satisfy a desired block error rate, specifically, in such a reference SIR where an interval at which an error occurs becomes too long. In such a case, the method described above takes a long time for the reference SIR to settle down to the lowest value needed to satisfy a desired block error rate.

Therefore, by the following method, this fact is prevented and the reference SIR is more rapidly settled down to the lowest value needed to satisfy a desired block error rate.

If the reference SIR is large in the initial state of communications, an error is difficult to occur. In this case, if the setting value described above is used, the reference SIR can be decreased only during each observation time period T. Therefore, as shown in FIG. 22, it takes a long time for the reference SIR to settle down to a stable state.

Conversely, if the reference SIR is too small in the initial state of communications, an error occurs in almost every frame. Therefore, the reference SIR reaches a stable state in a short time.

In the tenth preferred embodiment, in the initial state of communications, if there is no error, the reference SIR is decreased before the preset number of errors occur even if the observation time period does not come to an end. After the preset number of errors occur, the reference SIR is increased/decreased according to the algorithm shown in the first to third preferred embodiments. In this way, as shown in FIG. 23, even if the reference SIR in the initial state of communications is too large, a time needed for the reference SIR to settle down to the stable state can be shortened. Therefore, the interference to other users can be reduced and stable communications can be more rapidly conducted.

FIG. 24 is a flowchart showing the process of the tenth preferred embodiment.

First, in an initial state process, in step S80, a state is set to an initial state and the number of increases is reset. In step S81 a CRC is detected and in step S82 it is judged whether there is an error, based on the result of the CRC detection. If it is judged that there is no error, in step S83 the reference SIR is decreased by the preset amount. If it is judged that there is an error, in step S84 the reference SIR is increased by the preset amount. Then, in step S85 the number of increases is incremented and the process proceeds to step S86.

In step S86, it is judged whether the number of increases exceeds a setting value. If it is judged that the number of increases is below the setting value, the process returns to step S81. If in step S86 it is judged that the number of increases is beyond the setting value, in step S87 the state is set to a stable state and the process proceeds to a stable state.

In a stable state process, in step S88, the number of observation blocks is reset and in step S89 the CRC is detected. In step S90, it is judged whether there is an error, based on the result of the CRC detection. If it is judged that there is an error, in step S91 the reference SIR is increased by Sinc. If in step S90 it is judged that there is no error, in step S92 the number of observation blocks is incremented and in step S93 it is judged whether the number of observation blocks exceeds that during the observation time period.

If the judgment in step S93 is no, the process returns to step S89. If the judgment in step S93 is yes, in step S94 the reference SIR is decreased by Sdec and the process returns to step S88.

Although in this preferred embodiment, the stable state process is described using the first preferred embodiment, the process is not limited to the first preferred embodiment and can also be used in the other preferred embodiments.

Although in this preferred embodiment, the reference SIR increase/decrease steps in an initial state are preset, a designer should set the increase/decrease steps.

FIG. 25 shows the configuration of the device of the tenth preferred embodiment. Although the configuration shown in FIG. 25 is almost the same as the configuration of the ninth preferred embodiment, the configuration shown in FIG. 25 comprises a state setting unit distinguishing an initial state from a stable state. The state of the reference SIR control unit set by the state setting unit is stored in a state register. The state setting unit comprises an increase counter, which counts the number of increases in an initial state. After a prescribed number of increase processes are completed, the state setting unit judges that the reference SIR has settled down to a stable state and moves to a reference SIR update process in a stable state. For the reference SIR update method, that of each preferred embodiment described above can be used.

Figure 26:
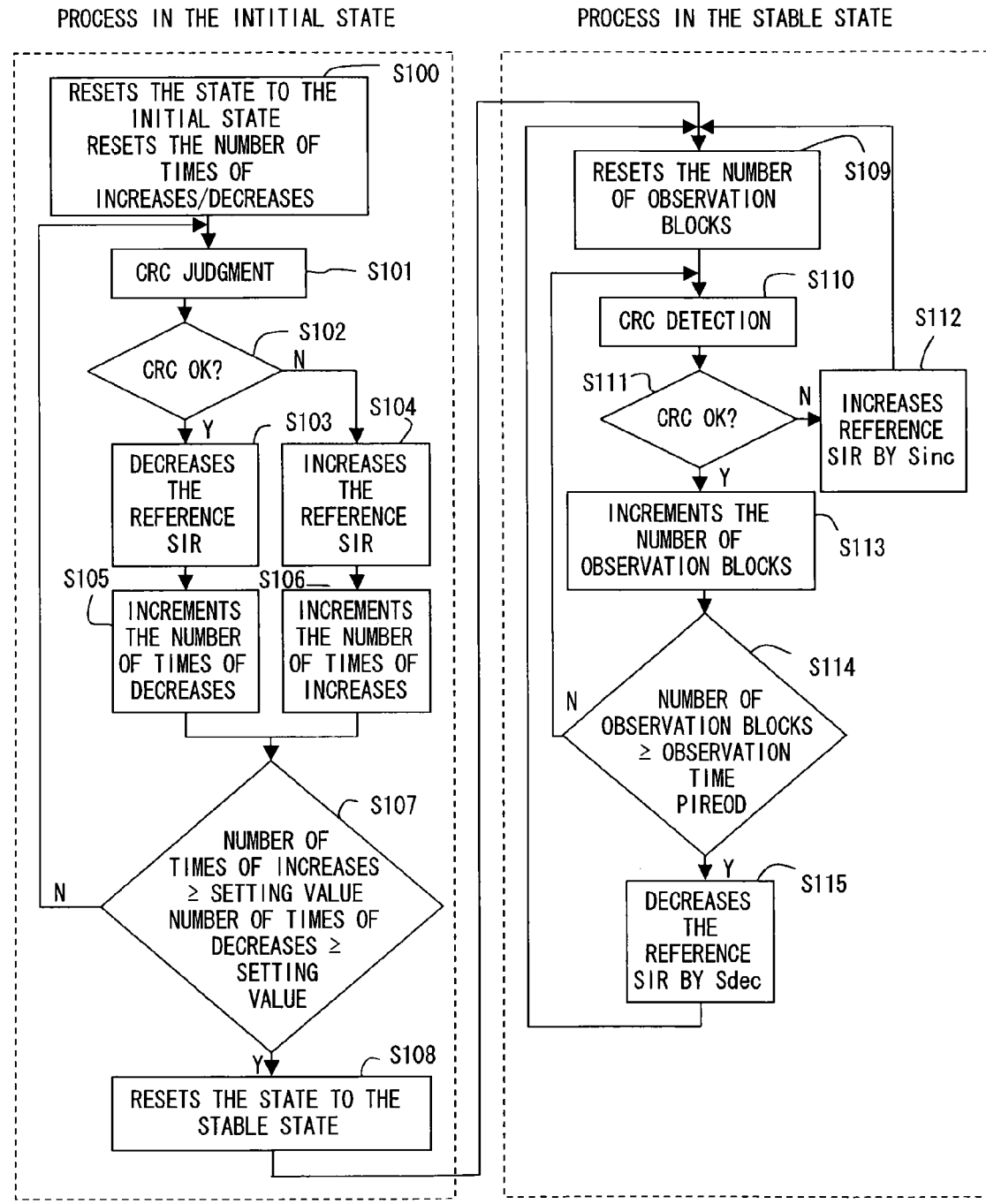
FIG. 26 shows the eleventh preferred embodiment of the present invention (No. 1).
Figure 27:
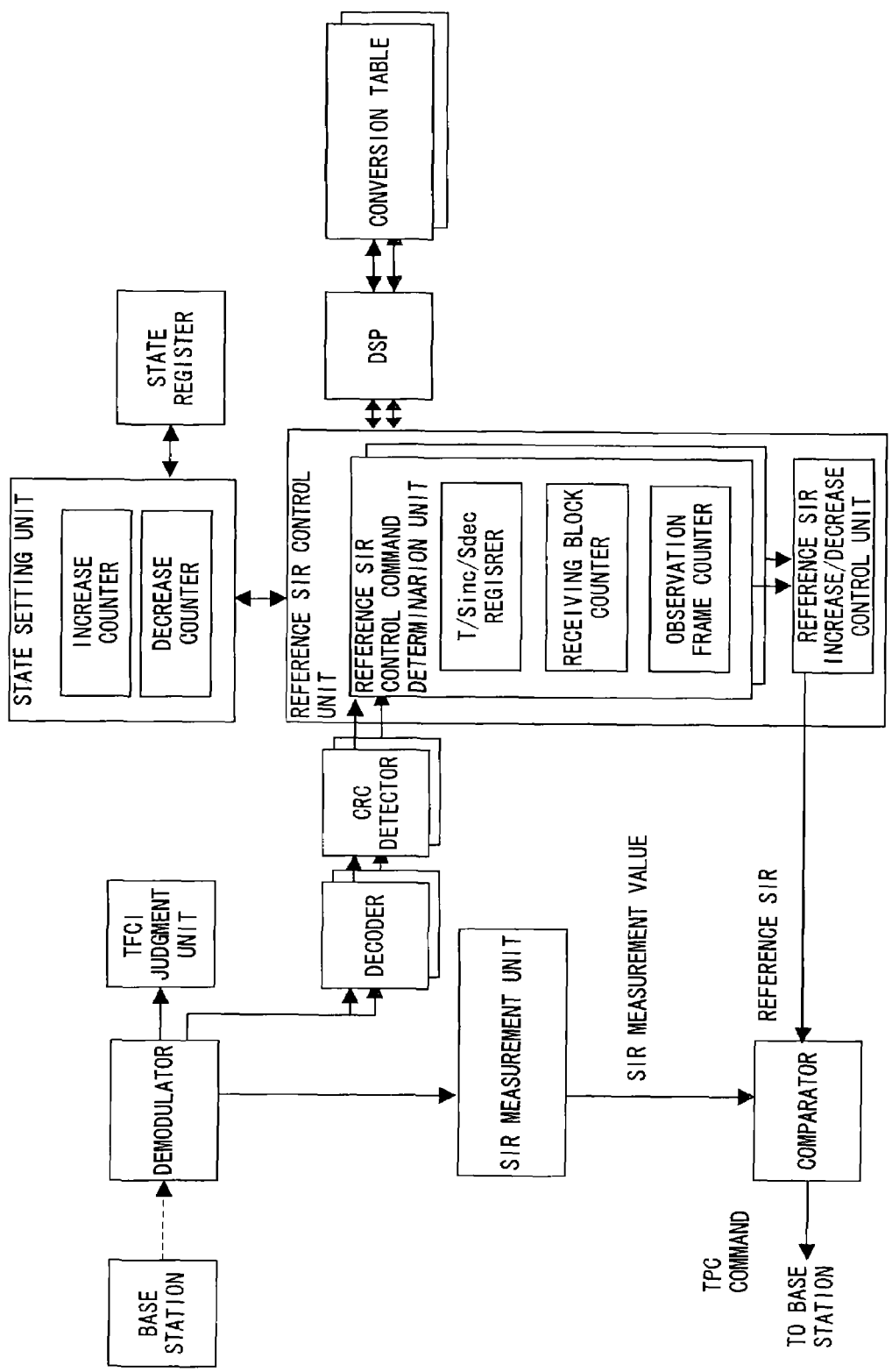
FIG. 27 shows the eleventh preferred embodiment of the present invention (No. 2).

FIGS. 26 and 27 show the eleventh preferred embodiment of the present invention.

In the initial state of communications, the reference SIR is updated for each block. As a reference SIR increase/decrease control amount in an initial state, a large value is set compared with that in a stable state. After more than a predetermined number of reference SIR increases/decreases, the reference SIR settles down to a stable state and ordinary outer-loop control is exercised in the way described about the first to ninth preferred embodiments. Since the reference SIR is increased/decreased for each frame, the reference SIR reaches a stable state in a short time even if the initial setting value of the reference SIR is too large or too small.

FIG. 26 is a flowchart showing the process of the eleventh preferred embodiment.

First, in the initial state process, in step S100, a state is set to an initial state and the number of increases/decreases is reset. In step S101, a CRC is detected. In step S102, it is judged whether there is an error, based on the result of the CRC detection. If it is judged that there is no error, in step S103 the reference SIR is decreased. Then, in step S105, the number of decreases is incremented and the process proceeds to step S107. If in step S102 it is judged that there is an error, in step S104 the reference SIR is increased. Then, in step S106, the number of increases is incremented and the process proceeds to step S107.

In step S107, it is judged whether the number of increases/decreases exceeds a setting value. If the judgment in step S107 is no, the process returns to step S101. If the judgment in step S107 is yes, in step S108 the state is set to a stable state and the process proceeds to step S109.

In step S109, the number of observation blocks is reset and in step S110 the CRC is detected. In step S111 it is judged whether there is an error, based on the result of the CRC detection. If it is judged that there is an error, in step S112 the reference SIR is increased by Sinc and the process returns to step S109. If in step S111 it is judged that there is no error, in step S113 the number of observation blocks is incremented and in step S114 it is judged whether the number of observation blocks exceeds that of blocks during the observation time period. If the judgment in step S114 is no, the process returns to step S110. If the judgment in step S114 is yes, in step S115 the reference SIR is decreased by Sdec and the process returns to step S109.

As in the tenth preferred embodiment, for the stable state process, those of the first to ninth preferred embodiments can be used.

FIG. 27 shows the configuration of the device on the eleventh preferred embodiment.

Although the configuration shown in FIG. FIG. 27 is almost the same as that of the tenth preferred embodiment, in FIG. 27 the state setting unit comprises an increase counter, which counts the number of increases. If the counter value of the increase counter and the counter value of the decrease counter exceeds a prescribed value, the reference SIR control unit shifts from an initial state process to a stable state process. The state setting unit manages the state of the reference SIR control unit, and the current state is stored in the state register.

According to the present invention, since of the block error observation time period T, reference SIR increment Sinc, and reference SIR decrement Sdec, two parameters can be determined with priority, the parameters can be freely determined. Therefore, both a system and hardware can be flexibly designed as requested.

Even if a reference SIR is too large in the initial state of communications, a time needed for a reference SIR to settle down to a stable state can be shortened and interference to other users can be reduced. Therefore, stable communications can be more rapidly conducted.

What is claimed is:

1. An outer-loop power control device in which a reference signal-to-interference power ratio, which is a basis of transmission power control by a communications environment, is variable, comprising:
   a signal-to-interference power ratio measurement unit measuring a signal-to-interference power ratio of a receiving signal;
   an error rate measurement unit measuring an error rate of receiving data;
   a reference signal-to-interference power ratio modification unit setting either an observation time period of an error rate or a number of target observation blocks of the error rate, a unit increment of a reference signal-to-interference power ratio, a unit decrement of the reference signal-to-interference power ratio and a target signal error rate in such a way to satisfy a prescribed relation equation, changing a size of one or more of the unit increment and the unit decrement of the reference signal-to-interference power ratio according to the measured error rate, and modifying the reference signal-to-interference power ratio by a plurality of the unit increment or unit decrement based on the measured error rate; and
   a command generation unit generating a command for transmission power control by comparing the modified reference signal-to-interference power ratio with the measured interference power ratio.

2. The outer-loop power control device according to claim 1, wherein if the target signal error rate, the observation time period, the unit increment, and the unit decrement are assumed to be BLER, T, Sinc, and Sdec, respectively, the relation equation can be expressed as follows.

$$\{1-(1\text{-}BLER)^T\} \times \text{Sinc} = (1\text{-}BLER)^T \times \text{Sdec}$$

3. The outer-loop power control device according to claim 1, wherein if a plurality of pieces of data are multiplexed in one physical frame and if the number of multiplexed data, the target signal error rate of the data number, the observation time period, the unit increment, and the unit decrement are assumed to be i, $BLER_i$, T, Sinc, and Sdec, respectively, the relation equation can be expressed as follows.

$$\left[1 - \left\{\prod_i (1 - BLER_i)\right\}^T\right] \times Sinc = \left\{\prod_i (1 - BLER_i)\right\}^T \times Sdec$$

4. The outer-loop power control device according to claim 1, wherein if a plurality of pieces of data are multiplexed in one physical frame, if each piece of multiplexed data has a different number of blocks per unit time period $N_i$, and if the number of multiplexed data, the target signal error rate of the data number, the observation time period, the unit increment, and the unit decrement are assumed to be i, $BLER_i$, T, Sinc, and Sdec, respectively, the relation equation can be expressed as follows.

$$\left[1 - \left\{\prod_i (1 - BLER_i)^{Ni}\right\}^T\right] \times Sinc = \left\{\prod_i (1 - BLER_i)^{Ni}\right\}^T \times Sdec$$

5. The outer-loop power control device according to claim 1, wherein if a plurality of pieces of data are multiplexed in one physical frame and if an amount of multiplexed data, where the target signal error rate of the data number, the observation time period, the unit increment corresponding to the data number, and the unit decrement corresponding to the data number are assumed to be i, $BLER_i$, $T_i$, $Sinc_i$, and $Sdec_i$, respectively, the relation equation can be expressed as follows.

$$\{1-(1\text{-}BLER_i)^{Ti}\} \times Sinc_i = (1\text{-}BLER_i)^{Ti} \times Sdec_i$$

6. The outer-loop power control device according to claim 1, wherein if a plurality of pieces of data are multiplexed in one physical frame, if each piece of multiplexed data has a different number of blocks per unit time period $N_i$, and if the amount of multiplexed data, where the target signal error rate of the data number, the observation time period, the unit increment corresponding to the data number, and the unit decrement corresponding to the data number are assumed to be i, $BLER_i$, $T_i$, $Sinc_i$, and $Sdec_i$, respectively, the relation equation can be expressed as follows.

$$\{1-(1\text{-}BLER_i)^{Ni \times Ti}\} \times Sinc_i = (1\text{-}BLER_i)^{Ni \times Ti} \times Sdec_i$$

7. The outer-loop power control device according to claim 1, wherein if data blocks are irregularly transmitted/received, if each observation time period has a different number of transmitted/received data blocks, and if the number of data blocks observed during the observation time period, the target signal error rate, the unit increment, and the unit decrement are assumed to be B, BLER, Sinc, and Sdec, respectively, the relation equation can be expressed as follows.

$$\{1-(1\text{-}BLER)^B\} \times Sinc = (1\text{-}BLER)^B \times Sdec$$

8. The outer-loop power control device according to claim 1, wherein if data blocks are irregularly transmitted/received, if each observation time period has a different number of transmitted/received data blocks, and if the amount of multiplexed data, the target signal error rate of the data number, the number of data blocks of the received data number, the unit increment and the unit decrement are assumed to be i, $BLER_i$, $B_i$, Sinc, and Sdec, respectively, the relation equation can be expressed as follows.

$$\left[1 - \prod_i (1 - BLER_i)^{Bi}\right] \times Sinc = \prod_i (1 - BLER_i)^{Bi} \times Sdec$$

9. The outer-loop power control device according to claim 1, wherein if a plurality of pieces of data are multiplexed in one physical frame, if data blocks are irregularly transmitted/received, if each observation time period has a different number of transmitted/received data blocks, and if the amount of multiplexed data, the target signal error rate of the data number, the number of data blocks of the received data number, the unit increment corresponding to the data number and the unit decrement corresponding to the data number are assumed to be i, $BLER_i$, $B_i$, $Sinc_i$, and $Sdec_i$, respectively, the relation equation can be expressed as follows.

$$[1-(1-BLER_i)^{Bi}] \times Sinc_i = (1-BLER_i)^{Bi} \times Sdec_i$$

10. The outer-loop power control device according to claim 1, wherein in an initial state of communications, a reference signal-to-interference power ratio can be modified by a larger unit amount than a unit modification amount of a reference signal-to-interference power ratio in a stable state before a prescribed number of times of data error are observed.

11. The outer-loop power control device according to claim 1, wherein the observation time period of an error rate/number of target observation blocks of the error rate, unit increment of a reference signal-to-interference power ratio and unit decrement of the reference signal-to-interference power ratio that satisfy the relation equation are constituted into a table and using the target signal error rate as a key, and the observation time period/number of target observation, unit increment and unit decrement can be obtained by referring to the table.

12. An outer-loop power control method in which a reference signal-to-interference power ratio, which is the basis of transmission power control by a communications environment, is variable, comprising:

measuring a signal-to-interference power ratio of a receiving signal;

measuring an error rate of receiving data;

setting either an observation time period of an error rate or a number of target observation blocks of the error rate, a unit increment of a reference signal-to-interference power ratio, a unit decrement of the reference signal-to-interference power ratio and a target signal error rate in such a way to satisfy a prescribed relation equation, changing a size of one or more of the unit increment and the unit decrement of the reference signal-to-interference power ratio according to the measured error rate, and modifying the reference signal-to-interference power ratio by a plurality of the unit increment or unit decrement based on the measured error rate; and generating a command for power transmission control by comparing the modified reference signal-to-interference power ratio with the measured interference power ratio.

13. An outer-loop power control device in which a reference signal-to-interference power ratio, which is a basis of transmission power control by a communications environment, is variable, comprising:

a signal-to-interference power ratio measurement unit measuring a signal to interference power ratio of a receiving signal;

a reference signal-to-interference power ratio modification unit varying the reference signal-to-interference power ratio based on measurement result of an error rate in a measurement time period of the error rate and changing the reference signal-to-interference power ratio to a large value without waiting for an end of the measurement time period when an error of a signal is detected in the measurement time period; and a command generation unit generating a command signal for transmission power control by comparing the modified reference signal-to-interference power ratio with the measured interference power ratio.

* * * * *